(12) United States Patent
Revadigar et al.

(10) Patent No.: US 11,381,970 B2
(45) Date of Patent: Jul. 5, 2022

(54) SYSTEM AND METHOD FOR AUTHENTICATING A CONNECTION BETWEEN A USER DEVICE AND A VEHICLE USING PHYSICAL LAYER FEATURES

(71) Applicant: Huawei Technologies Co., Ltd., Shenzhen (CN)

(72) Inventors: Girish Shivalingappa Revadigar, Singapore (SG); Zhuo Wei, Singapore (SG); Tieyan Li, Singapore (SG); Yanjiang Yang, Singapore (SG); Hai Yu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/346,823

(22) Filed: Jun. 14, 2021

(65) Prior Publication Data
US 2021/0345110 A1     Nov. 4, 2021

Related U.S. Application Data

(63) Continuation of application No. PCT/CN2020/084994, filed on Apr. 15, 2020.

(51) Int. Cl.
*H04L 29/06*     (2006.01)
*H04L 29/08*     (2006.01)
(Continued)

(52) U.S. Cl.
CPC ........ *H04W 12/069* (2021.01); *H04B 17/318* (2015.01); *H04W 4/40* (2018.02);
(Continued)

(58) Field of Classification Search
CPC ....... H04W 12/069; H04W 4/80; H04W 4/40; H04W 12/03; H04W 12/0431
(Continued)

(56) References Cited

U.S. PATENT DOCUMENTS 9,947,153 B2   4/2018  Bergerhoff et al.
10,129,022 B1  11/2018 Al Faruque et al.
(Continued)

FOREIGN PATENT DOCUMENTS

CN   103945373 A   7/2014
CN   105346502 A   2/2016
(Continued)

OTHER PUBLICATIONS

Ji, Y., et al., "Chord: Thwarting Relay Attacks Among Near Field Communications," Advances in Databases and Information Systems, XP047504107, Feb. 21, 2019, 20 pages.
(Continued)

*Primary Examiner* — Haresh N Patel
(74) *Attorney, Agent, or Firm* — Conley Rose, P.C.

(57) ABSTRACT

A method for authenticating a connection between a user device and a vehicle includes sending, by the vehicle, a first wireless signal through a connection channel, receiving, by the vehicle, a second wireless signal through the connection channel, and acquiring, by the vehicle, a second signal strength sequence from second N continuous signal strength characteristics ($PF_{Veh}$) of the second wireless signal, receiving, by the user device from the vehicle, the first wireless signal, acquiring a first signal strength sequence from first N continuous signal strength characteristics ($PF_{UDev}$) of the first wireless signal, and communicating, by the user device, the first signal strength sequence to the vehicle.

24 Claims, 7 Drawing Sheets

(51) Int. Cl.
*H04W 12/069* (2021.01)
*H04B 17/318* (2015.01)
*H04W 4/80* (2018.01)
*H04W 4/40* (2018.01)
*H04W 12/0431* (2021.01)
*H04W 12/03* (2021.01)

(52) U.S. Cl.
CPC ............ *H04W 4/80* (2018.02); *H04W 12/03* (2021.01); *H04W 12/0431* (2021.01)

(58) Field of Classification Search
USPC .......................................................... 726/2
See application file for complete search history.

(56) References Cited

U.S. PATENT DOCUMENTS

| | | | |
|---|---|---|---|
| 2006/0223500 A1 | 10/2006 | Osugi et al. | |
| 2006/0273888 A1 | 12/2006 | Yamamoto | |
| 2008/0061925 A1* | 3/2008 | Bergerhoff | B60R 25/24 340/5.6 |
| 2014/0171107 A1* | 6/2014 | Kao | G01C 21/206 455/456.1 |
| 2014/0188348 A1 | 7/2014 | Gautama et al. | |
| 2014/0226503 A1* | 8/2014 | Cooper | G01S 5/021 370/252 |
| 2016/0131750 A1* | 5/2016 | Lu | G01S 11/06 342/458 |
| 2016/0192212 A1* | 6/2016 | Ko | H04W 40/12 370/252 |
| 2017/0018128 A1* | 1/2017 | Berezin | G07C 9/00309 |
| 2017/0105120 A1 | 4/2017 | Kang et al. | |
| 2017/0181052 A1* | 6/2017 | Zhang | H04W 36/0083 |
| 2017/0278330 A1 | 9/2017 | Buttolo et al. | |
| 2018/0103414 A1 | 4/2018 | Golsch | |
| 2018/0122158 A1* | 5/2018 | Six | G07C 1/24 |
| 2018/0186332 A1 | 7/2018 | Bocca et al. | |
| 2018/0255426 A1* | 9/2018 | Liao | G06F 3/04883 |
| 2019/0045580 A1* | 2/2019 | Chai | H04W 92/02 |
| 2019/0219397 A1* | 7/2019 | Liu | G01S 5/0252 |
| 2019/0311162 A1* | 10/2019 | Khojastepour | G01S 13/88 |
| 2020/0033463 A1* | 1/2020 | Lee | G01S 5/0252 |
| 2020/0068589 A1* | 2/2020 | Verma | H04L 5/0053 |
| 2021/0003660 A1* | 1/2021 | Brede | G01S 11/06 |
| 2021/0227368 A1* | 7/2021 | Krebs | H04W 4/80 |

FOREIGN PATENT DOCUMENTS

| | | |
|---|---|---|
| CN | 107021065 A | 8/2017 |
| CN | 107995608 A | 5/2018 |
| CN | 108092991 A | 5/2018 |
| CN | 108683500 A | 10/2018 |
| WO | 2017131116 A1 | 8/2017 |

OTHER PUBLICATIONS

Blackhat USA 2017, Mandalay Bay/Las Vegas,NV, Jul. 22-27, 2017, https://www.blackhat.com/us-17/briefings.html, 60 Pages.
Black Hat 2016: Ransomware Could Lock Your Brakes . . . At 75 MPH,Aug. 13, 2016,https://www.investors.com/news/technology/black-hat-2016-ransomware-could-lock-your-brakes-at-60-mph/, 5 Pages.
Francillon, A., et al., "Relay Attacks on Passive Keyless Entry and Start Systems in Modern Cars," in proceedings of Network and Distributed System Security (NDSS), Feb. 2011, 15 Pages.
Jasek, S., "Gattacking Bluetooth Smart Devices," Whitepaper, http://gattack.io/# Accessed online: Jul. 3, 2019, 15 Pages.
Tse, D., et al., "Fundamentals of wireless communications," Cambridge University Press, Dec. 9, 2004, 644 Pages.
Dodis< Y., et al., "Fuzzy Extractors: How to Generate Strong Keys from Biometrics and Other Noisy Data" SIAM Journal on Computing 38, 1, 97-139. Mar. 2008, 47 Pages.
Revadigar, G., et al., "Accelerometer and Fuzzy Vault-Based Secure Group Key Generation and Sharing Protocol for Smart Wearables", IEEE Transactions on Information Forensics and Security, vol. 12, No. 10, Oct. 2017, 16 Pages.
"BMW Digital Key.", 2018 BMW of North America, Jan. 15, 2019, 2 pages.
Model 3 Owner's Manual, Tesla, 2019.36.1, Australia, 197 Pages.
Tse, D., et al., "Fundamentals of Wireless Communication", Cambridge University Press 2005, 644 pages.

\* cited by examiner

SYSTEM AND METHOD FOR AUTHENTICATING A CONNECTION BETWEEN A USER DEVICE AND A VEHICLE USING PHYSICAL LAYER FEATURES

CROSS-REFERENCE TO RELATED APPLICATIONS

This application is a continuation of International Patent Application No. PCT/CN2020/084994 filed on Apr. 15, 2020, which claims priority to International Patent Application No. PCT/CN2019/082911 filed on Apr. 16, 2019. The disclosures of the aforementioned applications are hereby incorporated by reference in their entireties.

TECHNICAL FIELD

This disclosure relates to a system and method for authenticating connection between a user device and a vehicle. In particular, the disclosure utilizes the physical layer features of the channel between the user device and the vehicle to authenticate the connection between the user device and the vehicle.

BACKGROUND

Due to a convergence of technologies, an ever increasing number of devices are now able to seamlessly communicate wirelessly with the Internet or wirelessly exchange communications between themselves. As a result of this convergence, keyless entry systems (KES) for vehicles/automobiles are becoming more and more popular due to their ease of use, e.g. the physical car key may no longer be required and a mobile device may be configured to perform the function of the physical car key. This also allows multiple users to be authorized by the car's owner to use his/her car. These systems typically utilize a digital key that is loaded into or stored within the user's personal device e.g. a mobile phone, whereby this digital key is provided to the user by a trusted entity. This is usually done when the vehicle is delivered to the use and typically, BLUETOOTH Low Energy (BLE) technology will be used to allow the car and the user's device to communicate with each other. Such architecture is illustrated by system 100 in FIG. 1 whereby vehicle 105 is in wireless communication with users 102, 104, 106 and the digital key to gain access to vehicle 105 has been provided to these users.

Existing KES are vulnerable to cybersecurity attacks such as relay attacks. Some of the existing solutions use distance estimation methods to calculate the distance between the mobile device and the car (vehicle module) using the transmitted/received signal's features. In such solutions, the car will only accept commands from the device if the device is found to be within range of the car.

The existing KES solutions facilitate the unlocking and starting of the car when the physical key is in the pockets of the users. The digital key approach exemplifies another KES solution whereby the user's personal device e.g., mobile phone, will be loaded with an authorized 'digital key', and through the use of BLUETOOTH technology, the phone would then be able to unlock and start the car through this wireless communication technology. In both the scenarios described above, the physical key or the phone will transmit commands to the car when it is within range of the car. In order to detect whether the key or phone is within proximity of the car, existing solutions will then measure the wireless signal strength between the car and the key/phone. In other words, if a strong signal is measured this indicates that the communicating devices (car and key/user's device) are near to each other (in range). Thus, the car will then be configured to accept the commands sent by nearby user devices/key whose signal strength are above a certain threshold.

Many existing KES solutions suffer from active attacks such as replay and relay attacks. In relay attacks, an attacker will relay the command messages between the car and key/user's device even if they are far away or outside the range of the car or key/user device. When a key or user's device is under attack, the attacker's device will communicate with the real key/user's device and the attacker will impersonate the car, meaning, the attacker's device will spoof the commands/messages sent by the car for finding the key in its range. When the real key/user's device receives to this spoofed message that is sent by attacker's device, the real key/user's device will respond to the message as it would assume that the message is from the user's legitimate/own car. The attacker then captures/records the signal transmitted from the actual key/user's device, and proceeds to amplifies and transmits this relayed signal to the car. Upon receiving the messages sent by the attacker's device, the car will mistakenly interpret these commands as commands sent by the original key/user's device. Thus, the attacker can easily unlock and steal the car. Similarly, the attacker can also record and replay the messages between car and key/user's device to unlock and steal the car. These are some of the more serious threats faced by KES, and thus, it is important to ensure that wireless communications between the device and the car are highly secure.

For the above reasons, those skilled in the art are constantly striving to come up with a system and method for authenticating data transmission between a vehicle and the vehicle owner's mobile device with the objective of establishing a secure communications channel.

SUMMARY

The above and other problems are solved and an advance in the art is made by systems and methods provided by embodiments in accordance with the disclosure.

A first advantage of embodiments of systems and methods in accordance with the disclosure is that the system provides robust mutual authentication between a user's vehicle and the user's personal device, when the user is approaching the car, and also when the user is already near the car.

A second advantage of embodiments of systems and methods in accordance with the disclosure is that the system is able to detect and mitigate active attacks and man-in-the-middle type attacks during the authentication process thereby preventing vehicle theft from occurring and preventing the compromise of the vehicle's critical components.

A third advantage of embodiments of systems and methods in accordance with the disclosure is that the system can be easily integrated into any device or module that is BLE enabled.

The above advantages are provided by embodiments of a system in accordance with the disclosure operating in the following manner.

According to a first aspect of the disclosure, a method for authenticating, applied to a user device, user device and a vehicle module established a connection channel through a wireless mode, the method comprises receiving a first wireless signal through the connection channel from the vehicle module, acquiring a first signal strength sequence, the first signal strength sequence are generated by N continuous signal strength characteristics $PF_{UDev}$ of the first wireless signal, communicating the first signal strength sequence to the vehicle module, wherein the first signal strength sequence and a second signal strength sequence are used for authenticating the connection between the user device and the vehicle module, the second signal strength sequence are generated by N continuous signal strength characteristics $PF_{Veh}$ of a second wireless signal, the second wireless signal is received by the vehicle module from the user device through the connection channel.

With reference to the first aspect of the disclosure, the first signal strength sequence instruction comprises the N continuous signal strength characteristics $PF_{UDev}$.

With reference to the first aspect of the disclosure, the first signal strength sequence comprises a user string SUDev and a correction data C, and the method further comprises filtering the N continuous signal strength characteristics $PF_{UDev}$ the set of physical layer features $PF_{UDev}$ by a low pass filter, generating the user string $S_{UDev}$ and the correction data C by providing the filtered N continuous signal strength characteristics $PF_{UDev}$ set of physical layer features $PF_{UDev}$ to a generate (gen) function of the fuzzy extractor mechanism.

With reference to the first aspect of the disclosure, filtering the N continuous signal strength characteristics $PF_{UDev}$ set of physical layer features $PF_{UDev}$ by a low pass filter comprises removing noise component from the N continuous signal strength characteristics $PF_{UDev}$ set of physical layer features $PF_{UDev}$, and generating the user string $S_{UDev}$ and the correction data C comprises processing the filtered N continuous signal strength characteristics $PF_{UDev}$ set of physical layer features PFUDev in a window by m-ary quantization, wherein number of the filtered N continuous signal strength characteristics $PF_{UDev}$ set of physical layer features $PF_{UDev}$ in the window is denoted as W, number of quantization levels is denoted as m, a guard band is inserted between two consecutive quantization levels, the filtered N continuous signal strength characteristics $PF_{UDev}$ set of physical layer features $PF_{UDev}$ in the guard band are discarded, the filtered N continuous signal strength characteristics $PF_{UDev}$ set of physical layer features $PF_{UDev}$ out of the guard band are encoded according to respective quantization levels, the ratio of guard band to data is denoted as α, the m and the α are used for determining the size of quantization interval and guard band.

With reference to the first aspect of the disclosure, the m and the α are used for determining the size of quantization interval and guard band comprises:

$$\int_{l_{i-1}}^{l_i-g_i} f\tilde{s}d\tilde{s} = \frac{1-\alpha}{m}, \int_{l_i-g_i}^{l_i} f\tilde{s}d\tilde{s} = \frac{\alpha}{m-1},$$

where the size of quantization interval is denoted as $\int_{l_{i-1}}^{l_i-g_i} f\tilde{s}d\tilde{s}$, the guard band is denoted as $\int_{l_{i-1}}^{l_i} f\tilde{s}d\tilde{s}$.

With reference to the first aspect of the disclosure, the correction data C comprises number of the N continuous signal strength characteristics $PF_{UDev}$ set of physical layer features $PF_{UDev}$ in the window W, number of quantization levels m, the ratio of guard band to data α, and list of discarded the filtered the N continuous signal strength characteristics $PF_{UDev}$ set of physical layer features $PF_{UDev}$, $L_{UDVE}$.

With reference to the first aspect of the disclosure, the first wireless signal is a first BLE beacon's channel information.

With reference to the first aspect of the disclosure, before the user device acquired the first signal strength sequence, the method further comprises communicating an initiation instruction to the vehicle module, the initiation instruction is used for authenticating the user device.

With reference to the first aspect of the disclosure, the initiation instruction comprises a message authentication code (MAC) $M_{Ini}$, the $M_{Ini}$ instruct that the initiation instruction authenticated based on a BLUETOOTH user device (BUD) key ($K_{BTUDev}$), wherein the $K_{BTUDev}$ is shared between the user device and the vehicle module, or the initiation instruction comprises a sign (S), the sign instruct that the initiation instruction authenticated based on a public-key infrastructure (PKI)-private key associated with the user device ($Key_{Priv\_UDev}$), wherein the $Key_{Priv\_UDev}$ is shared between the user device and the vehicle module.

With reference to the first aspect of the disclosure, before receiving the first wireless signal through the connection channel from the vehicle module, the method further comprises establishing a BLUETOOTH pairing between the user device and the vehicle module using a BLUETOOTH connection key ($Key_{BTCon}$) when the BLE beacon emitted by the vehicle module is detected by the user device, whereby the $Key_{BTCon}$ is shared between the user device and the vehicle module.

With reference to the first aspect of the disclosure, before the user device acquired the first signal strength sequence, the method further comprises communicating a first initiation instruction to the vehicle module, the first initiation instruction is generated based on an identity of the user device IDUDev, the first initiation instruction' command identifier, and the first initiation instruction' MAC MIni, wherein the MAC MIni is generated based on the identity of the user device IDUDev, the initiation command and $K_{BTUDev}$ that is shared between the user device and the vehicle module, receiving a first acknowledgement instruction, the first acknowledgement instruction is generated based on an encrypted a first acknowledgement message and the first acknowledgement message MAC MAck, wherein the first acknowledgement message comprises a nonce n, a random string r, and the first acknowledgement instruction's command identifier and the first acknowledgement message is encrypted using the corresponding $K_{BTUDev}$, and the MAC MAck is generated based on the first acknowledgement message and the corresponding $K_{BTUDev}$.

With reference to the first aspect of the disclosure, communicating the first signal strength sequence to the vehicle module comprises communicating a second instruction and a third instruction to the vehicle module, the second instruction is generated based on an encrypted the second instruction and the second instruction MAC MVer, wherein the second instruction comprising the nonce n, the correction data C, and the second instruction's command identifier is encrypted using the $K_{BTUDev}$, and the second instruction MAC MVer is generated based on the second instruction and the $K_{BTUDev}$, the third instruction is generated based on an encrypted the third instruction and the third instruction MAC MAuth_Chk, the third instruction comprising the nonce n, an XOR operation between the random string r and the user string $S_{UDev}$, and the third instruction's command identifier is encrypted using the $K_{BTUDev}$, and the third instruction MAC MAuth_Chk is generated based on the third instruction and the $K_{BTUDev}$.

With reference to the first aspect of the disclosure, the method further comprises receiving a second message from the vehicle module, the second message is generated based on an encrypted second message and the second message MAC MApprv, wherein the encrypted second message is generated based on encrypting the second message by the corresponding $K_{BTUDev}$, the second message comprises the nonce n, and the second message's command identifier, and the second message MAC MApprv is generated based on the second message and the corresponding $K_{BTUDev}$, or receiving a third message from the vehicle module, the third message is generated based on an encrypted third message and the third message MAC MApprv, wherein the encrypted third message is generated based on encrypting the third message by the corresponding $K_{BTUDev}$, the third message comprises the nonce n, and the third message's command identifier, and the third message MAC MApprv is generated based on the third message and the corresponding $K_{BTUDev}$.

With reference to the first aspect of the disclosure, the user device and a vehicle module established a connection channel through a wireless mode comprises communicating a second initiation instruction to the vehicle module, the second initiation instruction comprises an encrypted forth message and a signed fifth message, wherein the encrypted forth message is generated based on encrypting the forth message by a PKI-public key associated with a vehicle module ($Key_{Pub\_Veh}$), the forth message comprises an identity of the user device IDUDev and the second initiation instruction's command identifier, the signed fifth message is generated based on signing the fifth message by a $Key_{Priv\_UDev}$, the fifth message is generated based on hashing the encrypted forth message by a $K_{BTUDev}$, receiving a second acknowledgement instruction, the second acknowledgement instruction comprises an encrypted sixth message and a signed seventh message, wherein the encrypted sixth message is generated based on encrypting the sixth message by the $K_{BTUDev}$, the sixth message comprises a nonce n, a random string r, and the second initiation instruction's command identifier, the signed seventh message is generated based on signing the seventh message by the $Key_{Pub\_Veh}$, the seventh message is generated based on hashing the encrypted sixth message by the $K_{BTUDev}$.

With reference to the first aspect of the disclosure, communicating the first signal strength sequence to the vehicle module comprises communicating a forth instruction and a fifth instruction to the vehicle module, the forth instruction comprises an encrypted eighth message and a signed first message, wherein the encrypted eighth message is generated based on encrypting the eighth message by the $K_{BTUDev}$, the eighth message comprises the nonce n, the correction data C, and the forth instruction's command identifier, the signed first message is generated based on signing the first message by a $Key_{Priv\_UDev}$, the first message is generated based on hashing the encrypted eighth message by the $K_{BTUDev}$, the fifth instruction comprises an encrypted tenth message and a signed eleventh message, wherein the encrypted tenth message is generated based on encrypting the tenth message by the $K_{BTUDev}$, the tenth message comprises the nonce n, an XOR operation between the random string r and the user string $S_{UDev}$, and the fifth instruction's command identifier, the signed eleventh message is generated based on signing the eleventh message by a $Key_{Priv\_UDev}$, the eleventh message is generated based on hashing the encrypted tenth message by the $K_{BTUDev}$.

With reference to the first aspect of the disclosure, the method further comprises receiving a twentieth message from the vehicle module, the twentieth message comprises an encrypted thirteenth message and a signed fourteenth message, wherein the encrypted thirteenth message is generated based on encrypting the thirteenth message by the $K_{BTUDev}$, the thirteenth message comprises the nonce n and the thirteenth message's command identifier, the signed fourteenth message is generated based on signing the fourteenth message by the $Key_{Priv\_UDev}$, the fourteenth message is generated based on hashing the encrypted thirteenth message by the $K_{BTUDev}$, or receiving a fifteenth message from the vehicle module, the fifteenth message comprises an encrypted sixteenth message and a signed seventeenth message, wherein the encrypted sixteenth message is generated based on encrypting the sixteenth message by the $K_{BTUDev}$, the sixteenth message comprises the nonce n, and the sixteenth message's command identifier, the signed seventeenth message is generated based on signing the seventeenth message by the $Key_{Priv\_UDev}$, the seventeenth message is generated based on hashing the encrypted sixteenth message by the $K_{BTUDev}$.

According to a second aspect of the disclosure, a method for authenticating, applied to a vehicle module, the vehicle module and a user device established a connection channel through a wireless mode, wherein the method comprises receiving a second wireless signal through the connection channel from the user device, acquiring a second signal strength sequence, the second signal strength sequence are generated by N continuous signal strength characteristics $PF_{Veh}$ of the second wireless signal, receiving a first signal strength sequence from the user device, the first signal strength sequence are generated based by N continuous signal strength characteristics $PF_{UDev}$ of a first wireless signal, the first wireless signal is received by the user device from the vehicle module through the connection channel, authenticating the connection between the user device and the vehicle module based on the first signal strength sequence and the second signal strength sequence.

With reference to the second aspect of the disclosure, the first signal strength sequence comprises the N continuous signal strength characteristics $PF_{UDev}$.

With reference to the second aspect of the disclosure, the first signal strength sequence comprises a user string $S_{UDev}$ and a correction data C, and the method further comprises filtering the N continuous signal strength characteristics $PF_{UDev}$ by a low pass filter, generating the user string $S_{UDev}$ and the correction data C by providing the filtered N continuous signal strength characteristics $PF_{UDev}$ to a gen function of the fuzzy extractor mechanism.

With reference to the second aspect of the disclosure, filtering the N continuous signal strength characteristics $PF_{UDev}$ by a low pass filter comprises removing noise component from the N continuous signal strength characteristics $PF_{UDev}$, and generating the user string $S_{UDev}$ and the correction data C comprises processing the filtered N continuous signal strength characteristics $PF_{UDev}$ in a window by m-ary quantization, wherein number of the filtered N continuous signal strength characteristics $PF_{UDev}$ in the window is denoted as W, number of quantization levels is denoted as m, a guard band is inserted between two consecutive quantization levels, the filtered N continuous signal strength characteristics $PF_{UDev}$ in the guard band are discarded, the filtered N continuous signal strength characteristics $PF_{UDev}$ out of the guard band are encoded according to respective quantization levels, the ratio of guard band to data is denoted as $\alpha$, the m and the $\alpha$ are used for determining the size of quantization interval and guard band.

With reference to the second aspect of the disclosure, the m and the $\alpha$ are used for determining the size of quantization interval and guard band comprises:

$$\int_{l_i-1}^{l_i-g_i} f\tilde{s}d\tilde{s} = \frac{1-\alpha}{m}, \int_{l_i-g_i}^{l_i} f\tilde{s}d\tilde{s} = \frac{\alpha}{m-1},$$

where the size of quantization interval is denoted as, $\int_{l_i-1}^{l_i-g_i} f\tilde{s}d\tilde{s}$, the guard band is denoted as $\int_{l_i-1}^{l_i} f\tilde{s}d\tilde{s}$.

With reference to the second aspect of the disclosure, the correction data C comprises number of the N continuous signal strength characteristics $PF_{UDev}$ in the window W, number of quantization levels m, the ratio of guard band to data α, and list of discarded the filtered the N continuous signal strength characteristics $PF_{UDev}$, $L_{UDVE}$.

With reference to the second aspect of the disclosure, the first wireless signal is a second BLE beacon's channel information.

With reference to the second aspect of the disclosure, before the vehicle module acquired the second signal strength sequence, the method further comprises receiving an initiation instruction from the user device, authenticating the user device based on the initiation instruction.

With reference to the second aspect of the disclosure, the initiation instruction comprises a MAC $M_{Ini}$, the MI instruct that the initiation instruction authenticated based on a $K_{BTUDev}$, wherein the $K_{BTUDev}$ is shared between the user device and the vehicle module, or the initiation instruction comprises a sign (S), the sign $M_{Ini}$ instruct that the initiation instruction authenticated based on a $Key_{Priv\_UDev}$ and the $K_{BTUDev}$ and a $Key_{Pub\_Veh}$, wherein the $Key_{Priv\_UDev}$ and the $K_{BTUDev}$ and the $Key_{Pub\_Veh}$ are shared between the user device and the vehicle module.

With reference to the second aspect of the disclosure,

With reference to the second aspect of the disclosure, the vehicle module and a user device established a connection channel through a wireless mode comprises receiving a first initiation instruction from the user device, the first initiation instruction is generated based on an identity of the user device IDUDev, the first initiation instruction's command identifier, and the first initiation instruction' MAC MIni, wherein the MAC MIni is generated based on the identity of the user device IDUDev, the initiation command and a $K_{BTUDev}$ that is shared between the user device and the vehicle module, communicating a first acknowledgement instruction to the user device, the first acknowledgement instruction is generated based on an encrypted first acknowledgement message and the first acknowledgement message MAC MAck, wherein the first acknowledgement message comprises a nonce n, a random string r, and the first acknowledgement instruction's command identifier and the first acknowledgement message is encrypted using the corresponding $K_{BTUDev}$, and the MAC MAck is generated based on the first acknowledgement message and the corresponding $K_{BTUDev}$.

With reference to the second aspect of the disclosure, receiving the first signal strength sequence from the user device comprises receiving a second instruction and a third instruction to the vehicle module, the second instruction is generated based on an encrypted the second instruction and the second instruction MAC MVer, wherein the second instruction comprising the nonce n, the correction data C, and the second instruction's command identifier is encrypted using the $K_{BTUDev}$, and the second instruction MAC MVer is generated based on the second instruction and the $K_{BTUDev}$, the third instruction is generated based on an encrypted the third instruction and the third instruction MAC MAuth_Chk, the third instruction comprising the nonce n, an XOR operation between the random string r and the user string $S_{UDev}$, and the third instruction's command identifier is encrypted using the $K_{BTUDev}$, and the third instruction MAC MAuth_Chk is generated based on the third instruction and the $K_{BTUDev}$.

With reference to the second aspect of the disclosure, the method further comprises communicating a second message to the user device, the second message is generated based on an encrypted second message and the second message MAC MApprv, wherein the encrypted second message is generated based on encrypting the second message by the corresponding $K_{BTUDev}$, the second message comprises the nonce n, and the second message's command identifier, and the second message MAC MApprv, is generated based on the second message and the corresponding $K_{BTUDev}$, or communicating a third message to the user device, the third message is generated based on an encrypted third message and the third message MAC MApprv, wherein the encrypted third message is generated based on encrypting the third message by the corresponding $K_{BTUDev}$, the third message comprises the nonce n, and the third message's command identifier, and the third message MAC MApprv is generated based on the third message and the corresponding $K_{BTUDev}$.

With reference to the second aspect of the disclosure, the vehicle module and a user device established a connection channel through a wireless mode comprises receiving a second initiation instruction from the user device, the second initiation instruction comprises an encrypted forth message and a signed fifth message, wherein the encrypted forth message is generated based on encrypting the forth message by a $Key_{Pub\_Veh}$, the forth message comprises an identity of the user device IDUDev and the second initiation instruction's command identifier, the signed fifth message is generated based on signing the fifth message by a $Key_{Priv\_UDev}$, the fifth message is generated based on hashing the encrypted forth message by a $K_{BTUDev}$, communicating a second acknowledgement instruction to the user device, the second acknowledgement instruction comprises an encrypted sixth message and a signed seventh message, wherein the encrypted sixth message is generated based on encrypting the sixth message by the $K_{BTUDev}$, the sixth message comprises a nonce n, a random string r, and the second initiation instruction's command identifier, the signed seventh message is generated based on signing the seventh message by the $Key_{Pub\_Veh}$, the seventh message is generated based on hashing the encrypted sixth message by the $K_{BTUDev}$.

With reference to the second aspect of the disclosure, receiving the first signal strength sequence from the user device comprises receiving a forth instruction and a fifth instruction from the user device, the forth instruction comprises an encrypted eighth message and a signed ninth message, wherein the encrypted eighth message is generated based on encrypting the eighth message by the $K_{BTUDev}$, the eighth message comprises the nonce n, the correction data C, and the forth instruction's command identifier, the signed ninth message is generated based on signing the ninth message by a $Key_{Priv\_UDev}$, the ninth message is generated based on hashing the encrypted eighth message by the $K_{BTUDev}$, the fifth instruction comprises an encrypted second message and a signed eleventh message, wherein the encrypted second message is generated based on encrypting the second message by the $K_{BTUDev}$, the second message comprises the nonce n, an XOR operation between the random string r and the user string $S_{UDev}$, and the fifth instruction's command identifier, the signed eleventh message is generated based on signing the eleventh message by a $Key_{Priv\_UDev}$, the eleventh message is generated based on hashing the encrypted second message by the $K_{BTUDev}$.

With reference to the second aspect of the disclosure, the method further comprises communicating a twentieth message to the user device, the twentieth message comprises an encrypted thirteenth message and a signed fourteenth message, wherein the encrypted thirteenth message is generated based on encrypting the thirteenth message by the $K_{BTUDev}$, the thirteenth message comprises the nonce n and the thirteenth message's command identifier, the signed fourteenth message is generated based on signing the fourteenth message by the $Key_{Priv\_UDev}$, the fourteenth message is generated based on hashing the encrypted thirteenth message by the $K_{BTUDev}$, or communicating a fifteenth message to the user device, the fifteenth message comprises an encrypted sixteenth message and a signed seventeenth message, wherein the encrypted sixteenth message is generated based on encrypting the sixteenth message by the $K_{BTUDev}$, the sixteenth message comprises the nonce n, and the sixteenth message's command identifier, the signed seventeenth message is generated based on signing the seventeenth message by the $Key_{Priv\_UDev}$, the seventeenth message is generated based on hashing the encrypted sixteenth message by the $K_{BTUDev}$.

With reference to the second aspect of the disclosure, the method further comprises establishing a BLUETOOTH pairing between the user device and the vehicle module using a $K_{BTCon}$ when the BLE beacon emitted by the vehicle module is detected by the user device, whereby the $K_{BTCon}$ is shared between the user device and the vehicle module.

According to a third aspect of the disclosure, A user device for authenticating, the user device and a vehicle module established a connection channel through a wireless mode, the user device comprises a receiving unit configured to receive a first wireless signal through the connection channel from the vehicle module, an acquiring unit configured to acquire a first signal strength sequence, the first signal strength sequence are generated by N continuous signal strength characteristics $PF_{UDev}$ of the first wireless signal, a communicating unit configured to communicate the first signal strength sequence to the vehicle module, wherein the first signal strength sequence and a second signal strength sequence are used for authenticating the connection between the user device and the vehicle module, the second signal strength sequence are generated by N continuous signal strength characteristics $PF_{Veh}$ of a second wireless signal, the second wireless signal is received by the vehicle module from the user device through the connection channel. With reference to the third aspect of the disclosure, the first signal strength sequence comprises the N continuous signal strength characteristics $PF_{UDev}$.

With reference to the third aspect of the disclosure, the first signal strength sequence comprises a user string $S_{UDev}$ and a correction data C.

With reference to the third aspect of the disclosure, the user device further comprises a filtering unit configured to filter the N continuous signal strength characteristics $PF_{UDev}$ by a low pass filter, a generating unit configured to generate the user string $S_{UDev}$ and the correction data C by providing the filtered N continuous signal strength characteristics $PF_{UDev}$ to a gen function of the fuzzy extractor mechanism.

With reference to the third aspect of the disclosure, the filtering unit filter the N continuous signal strength characteristics $PF_{UDev}$ by a low pass filter comprises the filtering unit remove noise component from the N continuous signal strength characteristics $PF_{UDev}$, and the generating unit generate the user string $S_{UDev}$ and the correction data C comprises the generating unit process the filtered N continuous signal strength characteristics $PF_{UDev}$ in a window by m-ary quantization, wherein number of the filtered N continuous signal strength characteristics $PF_{UDev}$ in the window is denoted as W, number of quantization levels is denoted as m, a guard band is inserted between two consecutive quantization levels, the filtered N continuous signal strength characteristics $PF_{UDev}$ in the guard band are discarded, the filtered N continuous signal strength characteristics $PF_{UDev}$ out of the guard band are encoded according to respective quantization levels, the ratio of guard band to data is denoted as $\alpha$, the m and the $\alpha$ are used for determining the size of quantization interval and guard band.

With reference to the third aspect of the disclosure, the m and the $\alpha$ are used for determining the size of quantization interval and guard band comprises:

$$\int_{l_{i-1}}^{l_i - g_i} f\tilde{s} d\tilde{s} = \frac{1-\alpha}{m}, \int_{l_i - g_i}^{l_i} f\tilde{s} d\tilde{s} = \frac{\alpha}{m-1},$$

where the size of quantization interval is denoted as, $\int_{l_{i-1}}^{l_i - g_i} f\tilde{s} d\tilde{s}$, the guard band is denoted as $\int_{l_{i-1}}^{l_i g_i} f\tilde{s} d\tilde{s}$.

With reference to the third aspect of the disclosure, the correction data C comprises number of the N continuous signal strength characteristics $PF_{UDev}$ in the window W, number of quantization levels m, the ratio of guard band to data $\alpha$, and list of discarded the filtered the N continuous signal strength characteristics $PF_{UDev}$, $L_{UDVE}$.

With reference to the third aspect of the disclosure, the first wireless signal is a first BLE beacon's channel information.

With reference to the third aspect of the disclosure, before the acquiring unit acquire the first signal strength sequence, the communicating unit further configured to communicate an initiation instruction to the vehicle module, the initiation instruction is used for authenticating the user device.

With reference to the third aspect of the disclosure, the initiation instruction comprises a MAC $M_{Ini}$, the $M_{Ini}$ instruct that the initiation instruction authenticated based on a $K_{BTUDev}$, wherein the $K_{BTUDev}$ is shared between the user device and the vehicle module, or, the initiation instruction comprises a sign (S), the sign instruct that the initiation instruction authenticated based on a $Key_{Priv\_UDev}$, wherein the $Key_{Priv\_UDev}$ is shared between the user device and the vehicle module.

With reference to the third aspect of the disclosure, the user device further comprises a establishing unit configured to establish a BLUETOOTH pairing between the user device and the vehicle module using a $Key_{BTCon}$ when the BLE beacon emitted by the vehicle module is detected by the user device, whereby the $Key_{BTCon}$ is shared between the user device and the vehicle module.

According to a fourth aspect of the disclosure, a vehicle module for authenticating, the vehicle module and a user device established a connection channel through a wireless mode, the vehicle module comprises a receiving unit configured to receive a second wireless signal through the connection channel from the user device, an acquiring unit configured to acquire a second signal strength sequence, the second signal strength sequence are generated by N continuous signal strength characteristics $PF_{Veh}$ of the second wireless signal, a receiving unit configured to receive a first signal strength sequence from the user device, the first signal strength sequence are generated based by N continuous signal strength characteristics $PF_{UDev}$ of a first wireless signal, the first wireless signal is received by the user device from the vehicle module through the connection channel, an authenticating unit configured to authenticate the connection between the user device and the vehicle module based on the first signal strength sequence and the second signal strength sequence.

With reference to the fourth aspect of the disclosure, the first signal strength sequence comprises the N continuous signal strength characteristics $PF_{UDev}$.

With reference to the fourth aspect of the disclosure, the first signal strength sequence comprises a user string $S_{UDev}$ and a correction data C, wherein the user string $S_{UDev}$ and the correction data C are generated based on providing the filtered the N continuous signal strength characteristics $PF_{UDev}$ to a gen function of the fuzzy extractor mechanism, and the filtered the N continuous signal strength characteristics $PF_{UDev}$ is generated based on filtering the N continuous signal strength characteristics $PF_{UDev}$ by a low pass filter.

With reference to the fourth aspect of the disclosure, the vehicle module further comprises a extracting unit configured to extract the correction data C from the first signal strength sequence, a filtering unit configured to filter the extracted correction data C and the N continuous signal strength characteristics $P_{FVeh}$ using a low pass filter, a generating unit configured to generate a vehicle string $S_{Veh}$ by providing the filtered N continuous signal strength characteristics P FVeh and the filtered correction data C to a reproduce (rep) function of the fuzzy extractor mechanism, and the authenticating unit authenticate the connection between the user device and the vehicle module comprises based on the user string $S_{UDev}$ and the vehicle string $S_{Veh}$ authenticating the connection between the user device and the vehicle module.

With reference to the fourth aspect of the disclosure, the filtering unit filter the extracted correction data C and the N continuous signal strength characteristics $P_{FVeh}$ using a low pass filter comprises the filtering unit remove noise component from the correction data C and the N continuous signal strength characteristics $P_{FVeh}$, and the generating unit generate the vehicle string $S_{Veh}$ comprises the generating unit process the filtered N continuous signal strength characteristics $P_{FVeh}$ and the filtered correction data C in a window by m-ary quantization, wherein number of the filtered N continuous signal strength characteristics $P_{FVeh}$ in the window is denoted as W, number of quantization levels is denoted as m, a guard band is inserted between two consecutive quantization levels, the filtered N continuous signal strength characteristics $P_{FVeh}$ in the guard band are discarded, the filtered N continuous signal strength characteristics $P_{FVeh}$ out of the guard band are encoded according to respective quantization levels, the ratio of guard band to data is denoted as $\alpha$, the m and the $\alpha$ are used for determining the size of quantization interval and guard band.

With reference to the fourth aspect of the disclosure, the m and the $\alpha$ are used for determining the size of quantization interval and guard band comprises:

$$\int_{l_{i-1}}^{l_i-g_i} f\tilde{s}d\tilde{s} = \frac{1-\alpha}{m}, \int_{l_i-g_i}^{l_i} f\tilde{s}d\tilde{s} = \frac{\alpha}{m-1},$$

where the size of quantization interval is denoted as, $\int_{l_{i-1}}^{l_i-g_i} f\tilde{s}d\tilde{s}$, the guard band is denoted as $\int_{l_{i-1}}^{l_i g_i} f\tilde{s}d\tilde{s}$.

With reference to the fourth aspect of the disclosure, based on the user string $S_{UDev}$ and the vehicle string $S_{Veh}$ authenticating the connection between the user device and the vehicle module comprises the connection between the user device and the vehicle module is valid when the characters at M corresponding positions in the user string $S_{UDev}$ and the vehicle string $S_{Veh}$ are the same, where the M is a positive integer greater than or equal to a preset threshold.

With reference to the fourth aspect of the disclosure, the second wireless signal is a second BLE beacon's channel information.

With reference to the fourth aspect of the disclosure, before the acquiring unit acquired the second signal strength sequence, the receiving unit further configured to receive an initiation instruction from the user device, the authenticating unit further configured to authenticate the user device based on the initiation instruction.

With reference to the fourth aspect of the disclosure, the initiation instruction comprises a MAC $M_{Ini}$, the $M_{Ini}$ instruct that the initiation instruction authenticated based on a $K_{BTUDev}$, wherein the $K_{BTUDev}$ is shared between the user device and the vehicle module, or the initiation instruction comprises a sign (S), the sign $M_{Ini}$ instruct that the initiation instruction authenticated based on a $Key_{Priv\_UDev}$ and the $K_{BTUDev}$ and a $Key_{Pub\_Veh}$, wherein the $Key_{Priv\_UDev}$ and the $K_{BTUDev}$ and the $Key_{Pub\_Veh}$ are shared between the user device and the vehicle module.

With reference to the fourth aspect of the disclosure, before the receiving unit receives a second wireless signal through the connection channel from the user device, the vehicle module further comprises a establishing unit configured to establish a BLUETOOTH pairing between the user device and the vehicle module using a $Key_{BTCon}$, when the BLE beacon emitted by the vehicle module is detected by the user device, whereby the $Key_{BTCon}$ is shared between the user device and the vehicle module.

According to a fifth aspect of the disclosure, an authentication device, is characterized in that, comprising a processor and a memory, the memory is configured to store programs to be executed by the processor and to store data generated during the execution of the programs, the processor is configured to read the programs stored in the memory to perform the first aspect method of the disclosure.

According to a fifth aspect of the disclosure, an authentication device, is characterized in that, comprising a processor and a memory, the memory is configured to store programs to be executed by the processor and to store data generated during the execution of the programs, the processor is configured to read the programs stored in the memory to perform the second aspect method of the disclosure.

According to a sixth aspect of the disclosure, a vehicle authenticating system is disclosed, the system comprising a user device that is configured to generate an initiation instruction based on an identity of the user device $ID_{UDev}$, an initiation command, and an initiation MAC $M_{Ini}$, wherein the MAC $M_{Ini}$ is generated based on the identity of the user device $ID_{UDev}$, the initiation command and a $K_{BTUDev}$ that is shared between the user device and a vehicle module, communicate the initiation instruction to the vehicle module such that upon receiving the initiation instruction, the vehicle module is configured to retrieve a corresponding $K_{BTUDev}$, from a database, based on the received initiation instruction and validate the initiation instruction using the retrieved corresponding $K_{BTUDev}$, generate an acknowledgement instruction based on an encrypted acknowledgement message and an acknowledgement MAC $M_{Ack}$, when the initiation instruction is validated, wherein the acknowledgement message comprises a nonce n, a random string r, and an acknowledgement command and the acknowledgement message is encrypted using the corresponding $K_{BTUDev}$, and the acknowledgement MAC $M_{Ack}$ is generated based on the acknowledgement message and the corresponding $K_{BTUDev}$, communicate the acknowledgement instruction to the user device, record a set of physical layer features $PF_{Veh}$ of the BLE beacon's channel, the user device further configured to validate the acknowledgement instruction using the $K_{BTUDev}$, record a set of physical layer features $PF_{UDev}$ of the BLE beacon's channel when the acknowledgement instruction is validated, and authenticate the vehicle module when the set of physical layer features $PF_{UDev}$ and the set of physical layer features $PF_{Veh}$ are validated by a fuzzy extractor mechanism.

With reference to the sixth aspect of the disclosure, the validation of the set of physical layer features $PF_{UDev}$ and the set of physical layer features $PF_{Veh}$ by the fuzzy extractor mechanism comprises the user device being configured to filter the set of physical layer features $PF_{UDev}$ using a low pass filter, generate a user string $S_{UDev}$ and a correction data C by providing the filtered set of physical layer features $PF_{UDev}$ to a gen function of the fuzzy extractor mechanism, generate a verification instruction based on an encrypted verification message and a verification MAC $M_{Ver}$, wherein the verification message comprising the nonce n, the correction data C, and a verification command is encrypted using the $K_{BTUDev}$, and the verification MAC $M_{Ver}$, is generated based on the verification message and the $K_{BTUDev}$, generate an authentication check instruction based on an encrypted authentication check message and an authentication check MAC $M_{Auth\_Chk}$, wherein the authentication check message comprising the nonce n, an XOR operation between the random string r and the user string $S_{UDev}$, and an authentication check command is encrypted using the $K_{BTUDev}$, and the authentication check MAC $M_{Auth\_Chk}$, is generated based on the authentication check message and the $K_{BTUDev}$, communicate the verification instruction and the authentication check instruction to the vehicle module such that upon receiving the verification and authentication check instructions, the vehicle module is configured to validate the verification and authentication check instructions using the $K_{BTUDev}$, extract the correction data C from the decrypted verification message, and filter the extracted correction data C and the set of physical layer features $PF_{Veh}$ using a low pass filter when the verification instruction is validated, generate a vehicle string $S_{Veh}$ by providing the filtered set of physical layer features $PF_{Veh}$ and the filtered correction data C to a rep function of the fuzzy extractor mechanism, generate an approval instruction based on an encrypted approval message and an approval MAC $M_{Apprv}$, wherein the approval message comprising the nonce n, and an approval command is encrypted using the corresponding $K_{BTUDev}$, and the approval MAC $M_{Apprv}$, is generated based on the approval message and the corresponding $K_{BTUDev}$, when the authentication check instruction is validated and when it is determined that the XOR operation between the random string r and the user string $S_{UDev}$ matches an XOR operation between the random string r and the vehicle string $S_{Veh}$, and communicate the approval instruction to the user device, the user device further configured to validate the approval instruction using the $K_{BTUDev}$, and authenticate the vehicle module based on the approval command in the decrypted approval message when the approval instruction is validated.

With reference to the sixth aspect of the disclosure, the set of physical layer features $PF_{UDev}$ comprises a sixth set of received signal strength values recorded by the user device and the set of physical layer features $PF_{Veh}$ comprises a second set of received signal strength values recorded by the vehicle module.

With reference to the sixth aspect of the disclosure, before the initiation instruction is generated by the user device, the user device is configured to establish a BLUETOOTH pairing between the user device and the vehicle module using a $Key_{BTCon}$ when the BLE beacon emitted by the vehicle module is detected by the user device, whereby the $K_{BTCon}$, is shared between the user device and the vehicle module.

According to a seventh aspect of the disclosure, a vehicle authenticating system is disclosed, the system comprising a user device that is configured to encrypt an initiation message, $m_o$, comprising an identity of the user device $ID_{UDev}$ and an initiation command, using a $Key_{Pub\_Veh}$, hash the encrypted initiation message using a $K_{BTUDev}$, and sign the hashed-encrypted initiation message using a $Key_{Priv\_UDev}$, generate an initiation instruction based on the encrypted initiation message and the signed-hashed-encrypted initiation message, communicate the initiation instruction to the vehicle module such that upon receiving the initiation instruction, the vehicle module is configured to verify the signed-hashed-encrypted initiation message in the initiation instruction using a PKI-public key associated with the user device ($Key_{Pub\_UDev}$), decrypt the encrypted initiation message using a PKI-private key associated with the vehicle module ($Key_{Priv\_Veh}$) and retrieve a corresponding $K_{BTUDev}$, from a database, based on the decrypted initiation message when the signed-hashed-encrypted initiation message is verified, encrypt an acknowledgement message, $m_2$, comprising a nonce n, a random string r, and an acknowledgement command, using the corresponding $K_{BTUDev}$, hash the encrypted acknowledgement message using the corresponding $K_{BTUDev}$, and sign the hashed-encrypted acknowledgement message using the $Key_{Priv\_Veh}$, generate an acknowledgement instruction based on the encrypted acknowledgement message and the signed-hashed-encrypted acknowledgement message, communicate the acknowledgement instruction to the user device, record a set of physical layer features $PF_{Veh}$ of the BLE beacon's channel, the user device further configured to verify the signed-hashed-encrypted acknowledgement message in the acknowledgement instruction using a $Key_{Pub\_Veh}$, decrypt the encrypted acknowledgement message using the $K_{BTUDev}$ when the signed-hashed-encrypted acknowledgement message is verified, record a set of physical layer features $PF_{UDev}$ of the BLE beacon's channel, and authenticate the vehicle module when the set of physical layer features $PF_{UDev}$ and the set of physical layer features $PF_{Veh}$ are validated by a fuzzy extractor mechanism.

With reference to the seventh aspect of the disclosure, the validation of the set of physical layer features $PF_{UDev}$ and the set of physical layer features $PF_{Veh}$ by the fuzzy extractor mechanism comprises the user device being configured to filter the set of physical layer features $PF_{UDev}$ using a low pass filter, generate a user string $S_{UDev}$ and a correction data C by providing the filtered set of physical layer features $PF_{UDev}$ to a gen function of the fuzzy extractor mechanism, encrypt a verification message, $m_4$, using the $K_{BTUDev}$, wherein the verification message $m_4$, comprises the nonce n, the correction data C, and a verification command, hash the encrypted verification message using the $K_{BTUDev}$, and sign the hashed-encrypted verification message using a $Key_{Priv\_UDev}$, generate a verification instruction based on the encrypted verification message and the signed-hashed-encrypted verification message, encrypt an authentication check message $m_6$ using the $K_{BTUDev}$, wherein the authentication check message $m_6$, comprises the nonce n, an XOR operation between the random string r and the user string $S_{UDev}$, and an authentication check command, hash the encrypted authentication check message using the $K_{BTUDev}$, and sign the hashed-encrypted authentication check message using a $Key_{Priv\_UDev}$, generate an authentication check instruction based on the encrypted authentication check message and the signed-hashed-encrypted authentication check message, communicate the verification and the authentication check instructions to the vehicle module such that upon receiving the verification and authentication check instructions, the vehicle module is configured to verify the signed-hashed-encrypted verification message in the verification instruction using a $Key_{Pub\_UDev}$, decrypt the encrypted verification message using the corresponding $K_{BTUDev}$, when the signed-hashed-encrypted verification message is verified, extract the correction data C, from the decrypted verification message, and filter the extracted correction data C and the set of physical layer features $PF_{Veh}$ using a low pass filter when the verification instruction is validated, generate a vehicle string $S_{Veh}$ by providing the filtered set of physical layer features $PF_{Veh}$ and the filtered correction data C to a rep function of the fuzzy extractor mechanism, verify the signed-hashed-encrypted authentication check message in the authentication check instruction using a $Key_{Pub\_UDev}$, decrypt the encrypted authentication check message using the corresponding $K_{BTUDev}$, when the signed-hashed-encrypted authentication check message is verified, encrypt an approval message $m_8$ using the $K_{BTUDev}$, wherein the approval message $m_8$, comprises the nonce n, and an approval command, hash the encrypted approval message using the $K_{BTUDev}$, and sign the hashed-encrypted authentication check message using a $Key_{Priv\_Veh}$, generate an approval instruction based on the encrypted approval message and the signed-hashed-encrypted approval message, when it is determined that the XOR operation between the random string r and the user string $S_{UDev}$ matches an XOR operation between the random string r and the vehicle string $S_{Veh}$, communicate the approval instruction to the user device, the user device further configured to verify the signed-hashed-encrypted approval message in the approval instruction using a $Key_{Pub\_Veh}$, decrypt the encrypted approval message using the $K_{BTUDev}$, when the signed-hashed-encrypted approval message is verified, and authenticate the vehicle module based on the approval command in the decrypted approval message.

With reference to the seventh aspect of the disclosure, the set of physical layer features $PF_{UDev}$ comprises a first set of received signal strength values recorded by the user device and the set of physical layer features $PF_{Veh}$ comprises a seventh set of received signal strength values recorded by the vehicle module.

With reference to the seventh aspect of the disclosure, before the initiation instruction is encrypted by the user device, the user device is configured to establish a BLUETOOTH pairing between the user device and the vehicle module using a $Key_{BTCon}$, when the BLE beacon emitted by the vehicle module is detected by the user device, whereby the $K_{BTCon}$, is shared between the user device and the vehicle module.

According to an eighth aspect of the disclosure, a user device for authenticating communications with a vehicle module, the user device comprising a processor, and a non-transitory media readable by the processor, the non-transitory media storing instructions that when executed by the processor, cause the processor to generate an initiation instruction based on an identity of the user device $ID_{UDev}$, an initiation command, and an initiation MAC $M_{Ini}$, wherein the MAC $M_{Ini}$ is generated based on the identity of the user device $ID_{UDev}$, the initiation command and a $K_{BTUDev}$ that is shared between the user device and the vehicle module, communicate the initiation instruction to the vehicle module such that upon receiving the initiation instruction, the vehicle module is configured to retrieve a corresponding $K_{BTUDev}$, from a database, based on the received initiation instruction and validate the initiation instruction using the retrieved corresponding $K_{BTUDev}$, generate an acknowledgement instruction based on an encrypted acknowledgement message and an acknowledgement MAC $M_{Ack}$, when the initiation instruction is validated, wherein the acknowledgement message comprises a nonce n, a random string r, and an acknowledgement command and the acknowledgement message is encrypted using the corresponding $K_{BTUDev}$, and the acknowledgement MAC $M_{Ack}$ is generated based on the acknowledgement message and the corresponding $K_{BTUDev}$, communicate the acknowledgement instruction to the user device, record a set of physical layer features $PF_{Veh}$ of the BLE beacon's channel, the user device further comprising instructions for directing the processor to validate the acknowledgement instruction using the $K_{BTUDev}$, record a set of physical layer features $PF_{UDev}$ of the BLE beacon's channel when the acknowledgement instruction is validated, and authenticate the vehicle module when the set of physical layer features $PF_{UDev}$ and the set of physical layer features $PF_{Veh}$ are validated by a fuzzy extractor mechanism.

With reference to the eighth aspect of the disclosure, the validation of the set of physical layer features $PF_{UDev}$ and the set of physical layer features $PF_{Veh}$ by the fuzzy extractor mechanism comprises the user device comprising instructions for directing the processor to filter the set of physical layer features $PF_{UDev}$ using a low pass filter, generate a user string $S_{UDev}$ and a correction data C by providing the filtered set of physical layer features $PF_{UDev}$ to a gen function of the fuzzy extractor mechanism, generate a verification instruction based on an encrypted verification message and a verification MAC $M_{Ver}$, wherein the verification message comprising the nonce n, the correction data C, and a verification command is encrypted using the $K_{BTUDev}$, and the verification MAC $M_{Ver}$, is generated based on the verification message and the $K_{BTUDev}$, generate an authentication check instruction based on an encrypted authentication check message and an authentication check MAC $M_{Auth\_Chk}$, wherein the authentication check message comprising the nonce n, an XOR operation between the random string r and the user string $S_{UDev}$, and an authentication check command is encrypted using the $K_{BTUDev}$, and the authentication check MAC $M_{Auth\_Chk}$, is generated based on the authentication check message and the $K_{BTUDev}$, communicate the verification instruction and the authentication check instruction to the vehicle module such that upon receiving the verification and authentication check instructions, the vehicle module configured to validate the verification and authentication check instructions using the $K_{BTUDev}$, extract the correction data C from the decrypted verification message, and filter the extracted correction data C and the set of physical layer features $PF_{Veh}$ using a low pass filter when the verification instruction is validated, generate a vehicle string $S_{Veh}$ by providing the filtered set of physical layer features $PF_{Veh}$ and the filtered correction data C to a rep function of the fuzzy extractor mechanism, generate an approval instruction based on an encrypted approval message and an approval MAC $M_{Apprv}$, wherein the approval message comprising the nonce n, and an approval command is encrypted using the corresponding $K_{BTUDev}$, and the approval MAC $M_{Apprv}$, is generated based on the approval message and the corresponding $K_{BTUDev}$, when the authentication check instruction is validated and when it is determined that the XOR operation between the random string r and the user string $S_{UDev}$ matches an XOR operation between the random string r and the vehicle string $S_{Veh}$, and communicate the approval instruction to the user device, the user device further comprising instructions for directing the processor to validate the approval instruction using the $K_{BTUDev}$, and authenticate the vehicle module based on the approval command in the decrypted approval message when the approval instruction is validated.

With reference to the eighth aspect of the disclosure, the set of physical layer features $PF_{UDev}$ comprises a first set of received signal strength values recorded by the user device and the set of physical layer features $PF_{Veh}$ comprises a second set of received signal strength values recorded by the vehicle module.

With reference to the eighth aspect of the disclosure, before the initiation instruction is generated by the user device, the user device comprises instructions for directing the processor to establish a BLUETOOTH pairing between the user device and the vehicle module using a $Key_{BTCon}$ when the BLE beacon emitted by the vehicle module is detected by the user device, whereby the $K_{BTCon}$, is shared between the user device and the vehicle module.

According to a ninth aspect of the disclosure, a user device for authenticating communications with a vehicle module is disclosed, the user device comprising a processor, and a non-transitory media readable by the processor, the non-transitory media storing instructions that when executed by the processor, cause the processor to encrypt an initiation message $m_o$ comprising an identity of the user device $ID_{UDev}$ and an initiation command, using a $Key_{Pub\_Veh}$, hash the encrypted initiation message using a $K_{BTUDev}$, and sign the hashed-encrypted initiation message using a $Key_{Priv\_UDev}$, generate an initiation instruction based on the encrypted initiation message and the signed-hashed-encrypted initiation message, communicate the initiation instruction to the vehicle module such that upon receiving the initiation instruction, the vehicle module is configured to verify the signed-hashed-encrypted initiation message in the initiation instruction using a $Key_{Pub\_UDev}$, decrypt the encrypted initiation message using a $Key_{Priv\_Veh}$ and retrieve a corresponding $K_{BTUDev}$ from a database, based on the decrypted initiation message when the signed-hashed-encrypted initiation message is verified, encrypt an acknowledgement message, $m_2$, comprising a nonce n, a random string r, and an acknowledgement command, using the corresponding $K_{BTUDev}$, hash the encrypted acknowledgement message using the corresponding $K_{BTUDev}$, and sign the hashed-encrypted acknowledgement message using the $Key_{Priv\_Veh}$, generate an acknowledgement instruction based on the encrypted acknowledgement message and the signed-hashed-encrypted acknowledgement message, communicate the acknowledgement instruction to the user device, record a set of physical layer features $PF_{Veh}$ of the BLE beacon's channel, the user device further comprising instructions for directing the processor to verify the signed-hashed-encrypted acknowledgement message in the acknowledgement instruction using a $Key_{Pub\_Veh}$, decrypt the encrypted acknowledgement message using the $K_{BTUDev}$ when the signed-hashed-encrypted acknowledgement message is verified, record a set of physical layer features $PF_{UDev}$ of the BLE beacon's channel, and authenticate the vehicle module when the set of physical layer features $PF_{UDev}$ and the set of physical layer features $PF_{Veh}$ are validated by a fuzzy extractor mechanism.

With reference to the ninth aspect of the disclosure, the validation of the set of physical layer features $PF_{UDev}$ and the set of physical layer features $PF_{Veh}$ by the fuzzy extractor mechanism comprises the user device comprising instructions for directing the processor to filter the set of physical layer features $PF_{UDev}$ using a low pass filter, generate a user string $S_{UDev}$ and a correction data C by providing the filtered set of physical layer features $PF_{UDev}$ to a gen function of the fuzzy extractor mechanism, encrypt a verification message, $m_4$, using the $K_{BTUDev}$, wherein the verification message $m_4$, comprises the nonce n, the correction data C, and a verification command, hash the encrypted verification message using the $K_{BTUDev}$, and sign the hashed-encrypted verification message using a $Key_{Priv\_UDev}$, generate a verification instruction based on the encrypted verification message and the signed-hashed-encrypted verification message, encrypt an authentication check message $m_6$ using the $K_{BTUDev}$, wherein the authentication check message $m_6$, comprises the nonce n, an XOR operation between the random string r and the user string $S_{UDev}$, and an authentication check command, hash the encrypted authentication check message using the $K_{BTUDev}$, and sign the hashed-encrypted authentication check message using a $Key_{Priv\_UDev}$, generate an authentication check instruction based on the encrypted authentication check message and the signed-hashed-encrypted authentication check message, communicate the verification and the authentication check instructions to the vehicle module such that upon receiving the verification and authentication check instructions, the vehicle module comprising instructions for directing the processor to verify the signed-hashed-encrypted verification message in the verification instruction using a $Key_{Pub\_UDev}$, decrypt the encrypted verification message using the corresponding $K_{BTUDev}$, when the signed-hashed-encrypted verification message is verified, extract the correction data C, from the decrypted verification message, and filter the extracted correction data C and the set of physical layer features $PF_{Veh}$ using a low pass filter when the verification instruction is validated, generate a vehicle string $S_{Veh}$ by providing the filtered set of physical layer features $PF_{Veh}$ and the filtered correction data C to a rep function of the fuzzy extractor mechanism, verify the signed-hashed-encrypted authentication check message in the authentication check instruction using a $Key_{Pub\_UDev}$, decrypt the encrypted authentication check message using the corresponding $K_{BTUDev}$, when the signed-hashed-encrypted authentication check message is verified, encrypt an approval message, $m_8$, using the $K_{BTUDev}$, wherein the approval message $m_8$, comprises the nonce n, and an approval command, hash the encrypted approval message using the $K_{BTUDev}$, and sign the hashed-encrypted authentication check message using a $Key_{Priv\_Veh}$, generate an approval instruction based on the encrypted approval message and the signed-hashed-encrypted approval message, when it is determined that the XOR operation between the random string r and the user string $S_{UDev}$ matches an XOR operation between the random string r and the vehicle string $S_{Veh}$, communicate the approval instruction to the user device, the user device further comprising instructions for directing the processor to verify the signed-hashed-encrypted approval message in the approval instruction using a $Key_{Pub\_Veh}$, decrypt the encrypted approval message using the $K_{BTUDev}$, when the signed-hashed-encrypted approval message is verified, and authenticate the vehicle module based on the approval command in the decrypted approval message.

With reference to the ninth aspect of the disclosure, the set of physical layer features $PF_{UDev}$ comprises a first set of received signal strength values recorded by the user device and the set of physical layer features $PF_{Veh}$ comprises a second set of received signal strength values recorded by the vehicle module.

With reference to the ninth aspect of the disclosure, before the initiation instruction is encrypted by the user device, the user device comprises instructions for directing the processor to establish a BLUETOOTH pairing between the user device and the vehicle module using a $Key_{BTCon}$ when the BLE beacon emitted by the vehicle module is detected by the user device, whereby the $K_{BTCon}$, is shared between the user device and the vehicle module.

According to a tenth aspect of the disclosure, a vehicle module for authenticating communications with a user device is disclosed, the vehicle module comprising a processor, and a non-transitory media readable by the processor, the non-transitory media storing instructions that when executed by the processor, cause the processor to receive an initiation instruction from the user device, wherein the initiation instruction is generated based on an identity of the user device $ID_{UDev}$, an initiation command, and an initiation MAC $M_{Ini}$, whereby the MAC $M_{Ini}$ is generated based on the identity of the user device $ID_{UDev}$, the initiation command and a $K_{BTUDev}$ that is shared between the user device and the vehicle module, retrieve a corresponding $K_{BTUDev}$, from a database, based on the received initiation instruction and validate the initiation instruction using the retrieved corresponding $K_{BTUDev}$, generate an acknowledgement instruction based on an encrypted acknowledgement message and an acknowledgement MAC $M_{Ack}$, when the initiation instruction is validated, wherein the acknowledgement message comprises a nonce n, a random string r, and an acknowledgement command and the acknowledgement message is encrypted using the corresponding $K_{BTUDev}$, and the acknowledgement MAC $M_{Ack}$ is generated based on the acknowledgement message and the corresponding $K_{BTUDev}$, record a set of physical layer features $PF_{Veh}$ of the BLE beacon's channel, communicate the acknowledgement instruction to the user device such that upon receiving the acknowledgement instruction, the user device configured to validate the acknowledgement instruction using the $K_{BTUDev}$, record a set of physical layer features $PF_{UDev}$ of the BLE beacon's channel when the acknowledgement instruction is validated, and authenticate the vehicle module when the set of physical layer features $PF_{UDev}$ and the set of physical layer features $PF_{Veh}$ are validated by a fuzzy extractor mechanism.

With reference to the tenth aspect of the disclosure, the validation of the set of physical layer features $PF_{UDev}$ and the set of physical layer features $PF_{Veh}$ by the fuzzy extractor mechanism comprises the user device comprising instructions for directing the processor to filter the set of physical layer features $PF_{UDev}$ using a low pass filter, generate a user string $S_{UDev}$ and a correction data C by providing the filtered set of physical layer features $PF_{UDev}$ to a gen function of the fuzzy extractor mechanism, generate a verification instruction based on an encrypted verification message and a verification MAC $M_{Ver}$, wherein the verification message comprising the nonce n, the correction data C, and a verification command is encrypted using the $K_{BTUDev}$, and the verification MAC $M_{Ver}$ is generated based on the verification message and the $K_{BTUDev}$, generate an authentication check instruction based on an encrypted authentication check message and an authentication check MAC $M_{Auth\_Chk}$, wherein the authentication check message comprising the nonce n, an XOR operation between the random string r and the user string $S_{UDev}$, and an authentication check command is encrypted using the $K_{BTUDev}$, and the authentication check MAC $M_{Auth\_Chk}$, is generated based on the authentication check message and the $K_{BTUDev}$, communicate the verification instruction and the authentication check instruction to the vehicle module such that upon receiving the verification and authentication check instructions, the vehicle module comprises instructions for directing the processor to validate the verification and authentication check instructions using the $K_{BTUDev}$, extract the correction data C from the decrypted verification message, and filter the extracted correction data C and the set of physical layer features $PF_{Veh}$ using a low pass filter when the verification instruction is validated, generate a vehicle string $S_{Veh}$ by providing the filtered set of physical layer features $PF_{Veh}$ and the filtered correction data C to a rep function of the fuzzy extractor mechanism, generate an approval instruction based on an encrypted approval message and an approval MAC $M_{Apprv}$, wherein the approval message comprising the nonce n, and an approval command is encrypted using the corresponding $K_{BTUDev}$, and the approval MAC $M_{Apprv}$, is generated based on the approval message and the corresponding $K_{BTUDev}$, when the authentication check instruction is validated and when it is determined that the XOR operation between the random string r and the user string $S_{UDev}$ matches an XOR operation between the random string r and the vehicle string $S_{Veh}$, and communicate the approval instruction to the user device, the user device further comprising instructions for directing the processor to validate the approval instruction using the $K_{BTUDev}$, and authenticate the vehicle module based on the approval command in the decrypted approval message when the approval instruction is validated.

With reference to the tenth aspect of the disclosure, the set of physical layer features $PF_{UDev}$ comprises a first set of received signal strength values recorded by the user device and the set of physical layer features $PF_{Veh}$ comprises a second set of received signal strength values recorded by the vehicle module.

With reference to the tenth aspect of the disclosure, before the initiation instruction is generated by the user device, the user device comprises instructions for directing the processor to establish a BLUETOOTH pairing between the user device and the vehicle module using a $Key_{BTCon}$, when the BLE beacon emitted by the vehicle module is detected by the user device, whereby the $K_{BTCon}$, is shared between the user device and the vehicle module.

According to a eleventh aspect of the disclosure, a vehicle module for authenticating communications with a user device is disclosed, the vehicle module comprising a processor, and a non-transitory media readable by the processor, the non-transitory media storing instructions that when executed by the processor, cause the processor to receive an initiation instruction from the user device, wherein the initiation instruction is generated based on an encrypted initiation message and a signed-hashed-encrypted initiation message, the initiation message, $m_o$, which comprises an identity of the user device $ID_{UDev}$ and an initiation command, is encrypted using a $Key_{Pub\_Veh}$, and the encrypted initiation message is hashed using a $K_{BTUDev}$, and signed using a $Key_{Priv\_UDev}$, verify the signed-hashed-encrypted initiation message in the initiation instruction using a $Key_{Pub\_UDev}$, decrypt the encrypted initiation message using a $\text{Key}_{Priv\_UDev}$ and retrieve a corresponding $K_{BTUDev}$, from a database, based on the decrypted initiation message when the signed-hashed-encrypted initiation message is verified, encrypt an acknowledgement message $m_2$ comprising a nonce n, a random string r, and an acknowledgement command, using the corresponding $K_{BTUDev}$, hash the encrypted acknowledgement message using the corresponding $K_{BTUDev}$, and sign the hashed-encrypted acknowledgement message using the $\text{Key}_{Priv\_Veh}$, generate an acknowledgement instruction based on the encrypted acknowledgement message and the signed-hashed-encrypted acknowledgement message, record a set of physical layer features $\text{PF}_{Veh}$ of the BLE beacon's channel, communicate the acknowledgement instruction to the user device such that upon receiving the acknowledgement instruction, the user device configured to verify the signed-hashed-encrypted acknowledgement message in the acknowledgement instruction using a $\text{Key}_{Pub\_Veh}$, decrypt the encrypted acknowledgement message using the $K_{BTUDev}$ when the signed-hashed-encrypted acknowledgement message is verified, record a set of physical layer features $\text{PF}_{UDev}$ of the BLE beacon's channel, and authenticate the vehicle module when the set of physical layer features $\text{PF}_{UDev}$ and the set of physical layer features $\text{PF}_{Veh}$ are validated by a fuzzy extractor mechanism.

With reference to the eleventh aspect of the disclosure, the validation of the set of physical layer features $\text{PF}_{UDev}$ and the set of physical layer features $\text{PF}_{Veh}$ by the fuzzy extractor mechanism comprises the user device comprising instructions for directing the processor to filter the set of physical layer features $\text{PF}_{UDev}$ using a low pass filter, generate a user string $S_{UDev}$ and a correction data C by providing the filtered set of physical layer features $\text{PF}_{UDev}$ to a gen function of the fuzzy extractor mechanism, encrypt a verification message, $m_4$, using the $K_{BTUDev}$, wherein the verification message $m_4$, comprises the nonce n, the correction data C, and a verification command, hash the encrypted verification message using the $K_{BTUDev}$, and sign the hashed-encrypted verification message using a $\text{Key}_{Priv\_UDev}$, generate a verification instruction based on the encrypted verification message and the signed-hashed-encrypted verification message, encrypt an authentication check message, $m_6$, using the $K_{BTUDev}$, wherein the authentication check message $m_6$, comprises the nonce n, an XOR operation between the random string r and the user string $S_{UDev}$, and an authentication check command, hash the encrypted authentication check message using the $K_{BTUDev}$, and sign the hashed-encrypted authentication check message using a $\text{Key}_{Priv\_UDev}$, generate an authentication check instruction based on the encrypted authentication check message and the signed-hashed-encrypted authentication check message, communicate the verification and the authentication check instructions to the vehicle module such that upon receiving the verification and authentication check instructions, the vehicle module comprising instructions for directing the processor to verify the signed-hashed-encrypted verification message in the verification instruction using a $\text{Key}_{Pub\_UDev}$, decrypt the encrypted verification message using the corresponding $K_{BTUDev}$, when the signed-hashed-encrypted verification message is verified, extract the correction data C, from the decrypted verification message, and filter the extracted correction data C and the set of physical layer features $\text{PF}_{Veh}$ using a low pass filter when the verification instruction is validated, generate a vehicle string $S_{Veh}$ by providing the filtered set of physical layer features $\text{PF}_{Veh}$ and the filtered correction data C to a rep function of the fuzzy extractor mechanism, verify the signed-hashed-encrypted authentication check message in the authentication check instruction using a $\text{Key}_{Pub\_UDev}$, decrypt the encrypted authentication check message using the corresponding $K_{BTUDev}$, when the signed-hashed-encrypted authentication check message is verified, encrypt an approval message $m_8$ using the $K_{BTUDev}$, wherein the approval message $m_8$, comprises the nonce n, and an approval command, hash the encrypted approval message using the $K_{BTUDev}$, and sign the hashed-encrypted authentication check message using a $\text{Key}_{Priv\_Veh}$, generate an approval instruction based on the encrypted approval message and the signed-hashed-encrypted approval message, when it is determined that the XOR operation between the random string r and the user string $S_{UDev}$ matches an XOR operation between the random string r and the vehicle string $S_{Veh}$, communicate the approval instruction to the user device, the user device further comprising instructions for directing the processor to verify the signed-hashed-encrypted approval message in the approval instruction using a $\text{Key}_{Pub\_Veh}$, decrypt the encrypted approval message using the $K_{BTUDev}$, when the signed-hashed-encrypted approval message is verified, and authenticate the vehicle module based on the approval command in the decrypted approval message.

With reference to the eleventh aspect of the disclosure, the set of physical layer features $\text{PF}_{UDev}$ comprises a first set of received signal strength values recorded by the user device and the set of physical layer features $\text{PF}_{Veh}$ comprises a second set of received signal strength values recorded by the vehicle module.

With reference to the eleventh aspect of the disclosure, before the initiation instruction is encrypted by the user device, the user device comprises instructions for directing the processor to establish a BLUETOOTH pairing between the user device and the vehicle module using a $\text{Key}_{BTCon}$ when the BLE beacon emitted by the vehicle module is detected by the user device, whereby the $K_{BTCon}$, is shared between the user device and the vehicle module.

According to a twelfth aspect of the disclosure, a method for authenticating a BLUETOOTH connection between a user device and a vehicle module is disclosed, the method comprising generating an initiation instruction based on an identity of the user device $\text{ID}_{UDev}$, an initiation command, and an initiation MAC $M_{Ini}$, wherein the MAC $M_{Ini}$ is generated based on the identity of the user device $\text{ID}_{UDev}$, the initiation command and a $K_{BTUDev}$ that is shared between the user device and a vehicle module, communicating the initiation instruction to the vehicle module such that upon receiving the initiation instruction, the vehicle module is configured to retrieve a corresponding $K_{BTUDev}$, from a database, based on the received initiation instruction and validate the initiation instruction using the retrieved corresponding $K_{BTUDev}$, generate an acknowledgement instruction based on an encrypted acknowledgement message and an acknowledgement MAC $M_{Ack}$, when the initiation instruction is validated, wherein the acknowledgement message comprises a nonce n, a random string r, and an acknowledgement command and the acknowledgement message is encrypted using the corresponding $K_{BTUDev}$, and the acknowledgement MAC $M_{Ack}$ is generated based on the acknowledgement message and the corresponding $K_{BTUDev}$, communicate the acknowledgement instruction to the user device, record a set of physical layer features $\text{PF}_{Veh}$ of the BLE beacon's channel, the method further comprising validating, using the user device, the acknowledgement instruction using the $K_{BTUDev}$, recording a set of physical layer features $\text{PF}_{UDev}$ of the BLE beacon's channel when the acknowledgement instruction is validated, and authenticating the vehicle module when the set of physical layer features $PF_{UDev}$ and the set of physical layer features $PF_{Veh}$ are validated by a fuzzy extractor mechanism.

With reference to the twelfth aspect of the disclosure, the validating of the set of physical layer features $PF_{UDev}$ and the set of physical layer features $PF_{Veh}$ by the fuzzy extractor mechanism comprises the steps of filtering, using the user device, the set of physical layer features $PF_{UDev}$ using a low pass filter, generating a user string $S_{UDev}$ and a correction data C by providing the filtered set of physical layer features $PF_{UDev}$ to a gen function of the fuzzy extractor mechanism, generating a verification instruction based on an encrypted verification message and a verification MAC $M_{Ver}$, wherein the verification message comprising the nonce n, the correction data C, and a verification command is encrypted using the $K_{BTUDev}$, and the verification MAC $M_{Ver}$, is generated based on the verification message and the $K_{BTUDev}$, generating an authentication check instruction based on an encrypted authentication check message and an authentication check MAC $M_{Auth\_Chk}$, wherein the authentication check message comprising the nonce n, an XOR operation between the random string r and the user string $S_{UDev}$, and an authentication check command is encrypted using the $K_{BTUDev}$, and the authentication check MAC $M_{Auth\_Chk}$, is generated based on the authentication check message and the $K_{BTUDev}$, communicating the verification instruction and the authentication check instruction to the vehicle module such that upon receiving the verification and authentication check instructions, the vehicle module is configured to validate the verification and authentication check instructions using the $K_{BTUDev}$, extract the correction data C from the decrypted verification message, and filter the extracted correction data C and the set of physical layer features $PF_{Veh}$ using a low pass filter when the verification instruction is validated, generate a vehicle string $S_{Veh}$ by providing the filtered set of physical layer features $PF_{Veh}$ and the filtered correction data C to a rep function of the fuzzy extractor mechanism, generate an approval instruction based on an encrypted approval message and an approval MAC $M_{Apprv}$, wherein the approval message comprising the nonce n, and an approval command is encrypted using the corresponding $K_{BTUDev}$, and the approval MAC $M_{Apprv}$, is generated based on the approval message and the corresponding $K_{BTUDev}$, when the authentication check instruction is validated and when it is determined that the XOR operation between the random string r and the user string $S_{UDev}$ matches an XOR operation between the random string r and the vehicle string $S_{Veh}$, and communicate the approval instruction to the user device, the method further comprising validating, using the user device, the approval instruction using the $K_{BTUDev}$, and authenticating the vehicle module based on the approval command in the decrypted approval message when the approval instruction is validated.

With reference to the twelfth aspect of the disclosure, the set of physical layer features $PF_{UDev}$ comprises a first set of received signal strength values recorded by the user device and the set of physical layer features $PF_{Veh}$ comprises a second set of received signal strength values recorded by the vehicle module.

With reference to the twelfth aspect of the disclosure, before the initiation instruction is generated by the user device, the method comprises the step of establishing a BLUETOOTH pairing between the user device and the vehicle module using a $Key_{BTCon}$ when the BLE beacon emitted by the vehicle module is detected by the user device, whereby the Key $K_{BTCon}$, is shared between the user device and the vehicle module.

According to an thirteenth aspect of the disclosure, a method for authenticating a BLUETOOTH connection between a user device and a vehicle module, the method comprising encrypting an initiation message $m_o$ comprising an identity of the user device $ID_{UDev}$ and an initiation command, using a $Key_{Pub\_Veh}$, hashing the encrypted initiation message using a $K_{BTUDev}$, and sign the hashed-encrypted initiation message using a $Key_{Priv\_UDev}$, generating an initiation instruction based on the encrypted initiation message and the signed-hashed-encrypted initiation message, communicating the initiation instruction to the vehicle module such that upon receiving the initiation instruction, the vehicle module is configured to verify the signed-hashed-encrypted initiation message in the initiation instruction using a $Key_{Pub\_UDev}$, decrypt the encrypted initiation message using a $Key_{Priv\_Veh}$ and retrieve a corresponding $K_{BTUDev}$, from a database, based on the decrypted initiation message when the signed-hashed-encrypted initiation message is verified, encrypt an acknowledgement message, $m_2$, comprising a nonce n, a random string r, and an acknowledgement command, using the corresponding $K_{BTUDev}$, hash the encrypted acknowledgement message using the corresponding $K_{BTUDev}$, and sign the hashed-encrypted acknowledgement message using the $Key_{Priv\_Veh}$, generate an acknowledgement instruction based on the encrypted acknowledgement message and the signed-hashed-encrypted acknowledgement message, communicate the acknowledgement instruction to the user device, record a set of physical layer features $PF_{Veh}$ of the BLE beacon's channel, the method further comprising the steps of verifying, using the user device, the signed-hashed-encrypted acknowledgement message in the acknowledgement instruction using a $Key_{Pub\_Veh}$, decrypting the encrypted acknowledgement message using the $K_{BTUDev}$ when the signed-hashed-encrypted acknowledgement message is verified, recording a set of physical layer features $PF_{UDev}$ of the BLE beacon's channel, and authenticating the vehicle module when the set of physical layer features $PF_{UDev}$ and the set of physical layer features $PF_{Veh}$ are validated by a fuzzy extractor mechanism.

With reference to the thirteenth aspect of the disclosure, the validating of the set of physical layer features $PF_{UDev}$ and the set of physical layer features $PF_{Veh}$ by the fuzzy extractor mechanism comprises the steps of filtering, using the user device, the set of physical layer features $PF_{UDev}$ using a low pass filter, generating a user string $S_{UDev}$ and a correction data C by providing the filtered set of physical layer features $PF_{UDev}$ to a gen function of the fuzzy extractor mechanism, encrypting a verification message, $m_4$, using the $K_{BTUDev}$, wherein the verification message $m_4$, comprises the nonce n, the correction data C, and a verification command, hashing the encrypted verification message using the $K_{BTUDev}$, and sign the hashed-encrypted verification message using a $Key_{Priv\_UDev}$, generating a verification instruction based on the encrypted verification message and the signed-hashed-encrypted verification message, encrypting an authentication check message, $m_6$, using the $K_{BTUDev}$, wherein the authentication check message $m_6$, comprises the nonce n, an XOR operation between the random string r and the user string $S_{UDev}$, and an authentication check command, hashing the encrypted authentication check message using the $K_{BTUDev}$, and sign the hashed-encrypted authentication check message using a $Key_{Priv\_UDev}$, generating an authentication check instruction based on the encrypted authentication check message and the signed-hashed-encrypted authentication check message, communicating the verification and the authentication check instructions to the vehicle module such that upon receiving the verification and authentication check instructions, the vehicle module is configured to verify the signed-hashed-encrypted verification message in the verification instruction using a $Key_{Pub\_UDev}$, decrypt the encrypted verification message using the corresponding $K_{BTUDev}$, when the signed-hashed-encrypted verification message is verified, extract the correction data C, from the decrypted verification message, and filter the extracted correction data C and the set of physical layer features $PF_{Veh}$ using a low pass filter when the verification instruction is validated, generate a vehicle string $S_{Veh}$ by providing the filtered set of physical layer features $PF_{Veh}$ and the filtered correction data C to a rep function of the fuzzy extractor mechanism, verify the signed-hashed-encrypted authentication check message in the authentication check instruction using a $Key_{Pub\_UDev}$, decrypt the encrypted authentication check message using the corresponding $K_{BTUDev}$, when the signed-hashed-encrypted authentication check message is verified, encrypt an approval message, $m_8$, using the $K_{BTUDev}$, wherein the approval message $m_8$, comprises the nonce n, and an approval command, hash the encrypted approval message using the $K_{BTUDev}$, and sign the hashed-encrypted authentication check message using a $Key_{Priv\_Veh}$, generate an approval instruction based on the encrypted approval message and the signed-hashed-encrypted approval message, when it is determined that the XOR operation between the random string r and the user string $S_{UDev}$ matches an XOR operation between the random string r and the vehicle string $S_{Veh}$, communicate the approval instruction to the user device, the method further comprising the steps of verifying the signed-hashed-encrypted approval message in the approval instruction using a $Key_{Pub\_Veh}$, decrypting the encrypted approval message using the $K_{BTUDev}$ when the signed-hashed-encrypted approval message is verified, and authenticating the vehicle module based on the approval command in the decrypted approval message.

With reference to the thirteenth aspect of the disclosure, the set of physical layer features $PF_{UDev}$ comprises a first set of received signal strength values recorded by the user device and the set of physical layer features $PF_{Veh}$ comprises a second set of received signal strength values recorded by the vehicle module.

With reference to the thirteenth aspect of the disclosure, before the initiation instruction is encrypted by the user device, the method comprises the steps of establishing a BLUETOOTH pairing between the user device and the vehicle module using a $Key_{BTCon}$ when the BLE beacon emitted by the vehicle module is detected by the user device, whereby the Key $K_{BTCon}$, is shared between the user device and the vehicle module.

BRIEF DESCRIPTION OF DRAWINGS

The above advantages and features in accordance with this disclosure are described in the following detailed description and are shown in the following drawings.

DESCRIPTION OF EMBODIMENTS

This disclosure describes a system and method for authenticating a connection between a user's device and a vehicle. In particular, the disclosure utilizes the physical layer features of the connection channel between the user's device and the vehicle to mutually authenticate the connection between the user's device and the vehicle.

The system allows for the secure and automatic authentication of user's mobile/personal device with the car using wireless technology. This system detects and confirms the proximity of user's device to the car and vice versa. The solution does this by exploiting the unique physical layer features of the BLE channel between the user's device and the car. An example of a physical layer feature is the received signal strength (RSS) as detected by the user's device or by the car. The wireless channel's physical features cannot be spoofed by an attacker and is extremely hard to predict. The mutual authentication steps to subsequently authenticate the recorded RSS features are designed based on a cryptographically secure fuzzy extractor mechanism and this system may be applied to two types of schemes, one for symmetric key based scenarios, and the other for PKI based scenarios.

Figure 1:
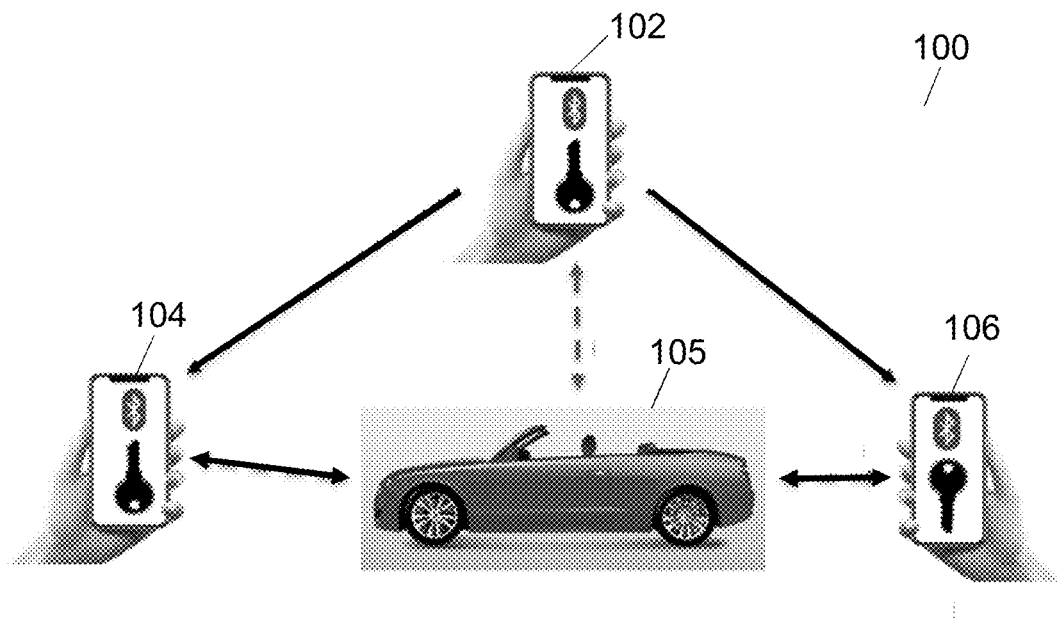
FIG. 1 illustrates a block diagram representative of an existing keyless entry system for vehicles.
Figure 2:
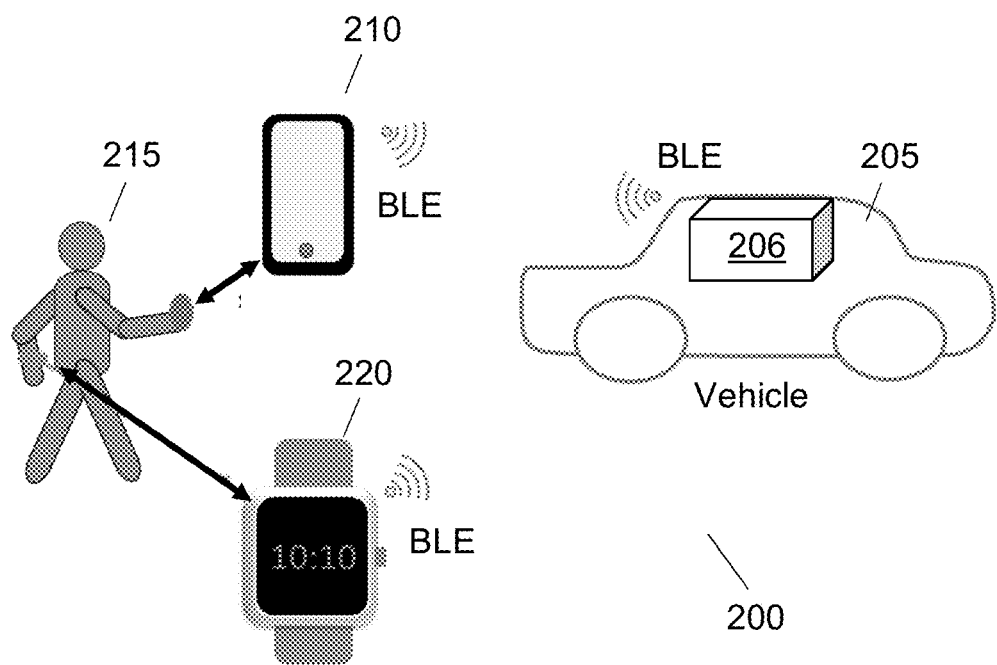
FIG. 2 illustrates a block diagram representative of a keyless entry system for vehicles in accordance with embodiments of the disclosure.

FIG. 2 illustrates a block diagram of keyless entry system 200 for vehicles in accordance with embodiments of the disclosure. System 200 comprises vehicle 205 and devices 210 and 220 that belong to user 215. Vehicle 205 is provided with vehicle module 206 that is configured to handle vehicle 205's external communications with other sources and vehicle module 206 and user devices 210 and 220 are all BLUETOOTH enabled. In accordance with embodiments of the disclosure, vehicle module 206 may comprise any electronic module, any computing device and/or any wireless transceiver with communication function, and the electronic module, the computing device and/or the wireless transceiver which is configured to receive, process, and transmit instructions relating to vehicle 205. One skilled in the art will recognize that vehicle module 206 may comprise any combinations or types of electronic devices that are able to perform the functions mentioned above without departing from this disclosure.

Prior to establishing a BLUETOOTH connection between devices 210, 220 and vehicle module 206, a $Key_{BTCon}$, is shared between devices 210, 220 and vehicle module 206 by a trusted entity. Once installed within the respective devices or module, this $Key_{BTCon}$, will be bound to the device or module and may not be transferred out to another device or module as this key, $Key_{BTCon}$ will be used to establish a BLUETOOTH connection and for encrypting BLE communications between devices 210, 220 and module 206.

A $Key_{BTUDev}$ is also shared between devices 210, 220 and vehicle module 206 by a trusted entity. Once installed within the respective devices or module, this $Key_{BTUDev}$ will be bound to the device or module and may not be transferred out to another device or module as this key $Key_{BTUDev}$ will be used for encrypting commands and data that are sent through the BLE communications between devices 210, 220 and module 206 thereby increasing the security of the transmitted data.

Figure 3:
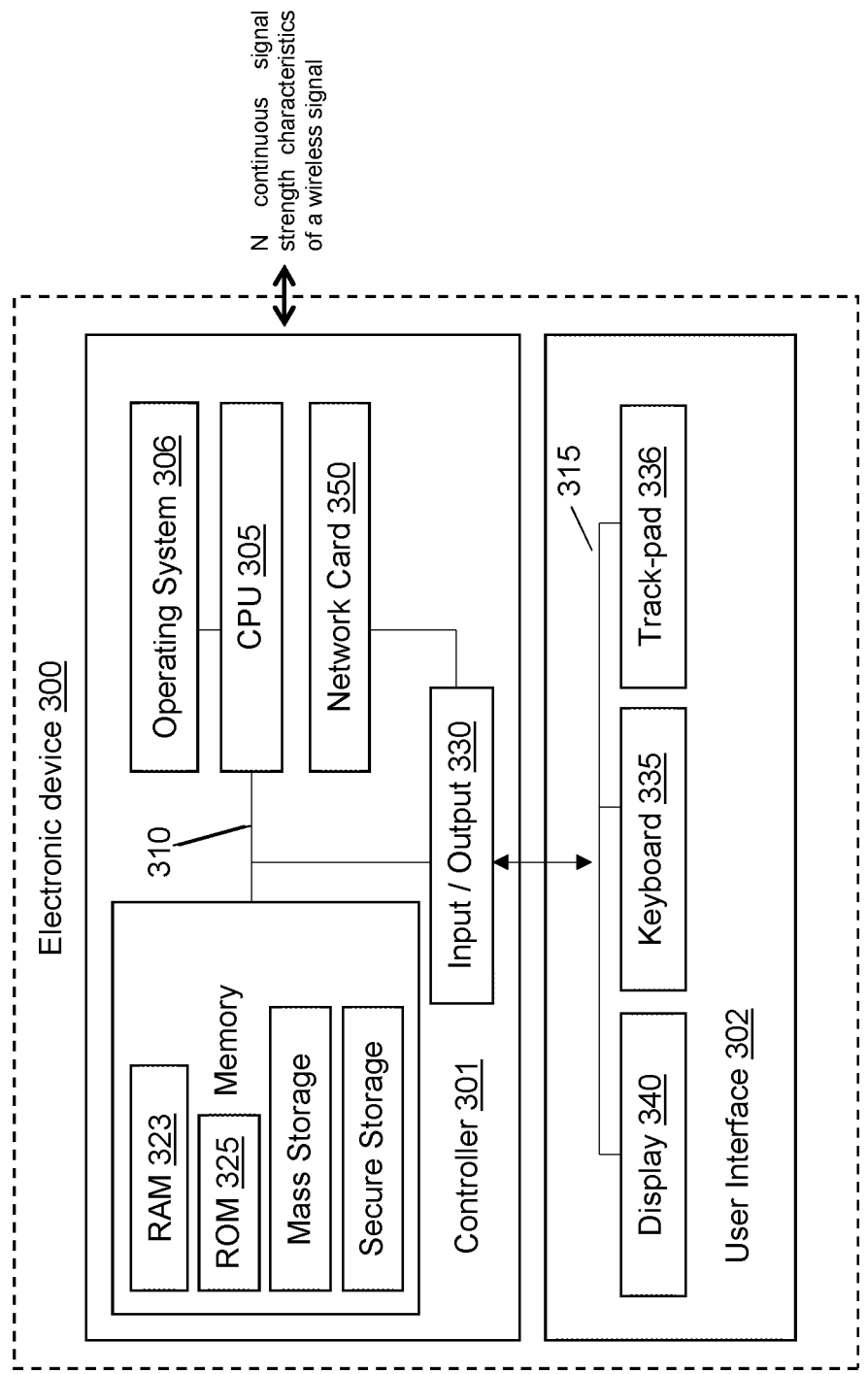
FIG. 3 illustrates a block diagram representative of components in an electronic device or module for implementing embodiments of the disclosure.

FIG. 3 illustrates a block diagram representative of components of an electronic device 300 that is provided within user devices 210, 220 and module 206 for implementing embodiments in accordance with embodiments of the disclosure. One skilled in the art will recognize that the exact configuration of each electronic device provided within the user devices or the vehicle module may be different and the exact configuration of electronic device 300 may vary and FIG. 3 is provided by way of example only.

In embodiments of the disclosure, device 300 comprises controller 301 and user interface 302. User interface 302 is arranged to enable manual interactions between a user and electronic device 300 and for this purpose includes the input/output components required for the user to enter instructions to control electronic device 300. A person skilled in the art will recognize that components of user interface 302 may vary from embodiment to embodiment but will typically include one or more of display 340 that may be touchscreen enabled, keyboard 335 and track-pad 336.

Controller 301 is in data communication with user interface 302 via bus 315 and includes memory 320, central processing unit (CPU) 305 mounted on a circuit board that processes instructions and data for performing the method of this embodiment, an operating system 306, an input/output (I/O) interface 330 for communicating with user interface 302 and a communications interface, in this embodiment in the form of a network card 350. Network card 350 may, for example, be utilized to send data from electronic device 300 via a wired or wireless network to other processing devices or to receive data via the wired or wireless network. Wireless networks that may be utilized by network card 350 include, but are not limited to, WI-FI, BLUETOOTH, Near-Field Communication (NFC), cellular networks, satellite networks, telecommunication networks, wide area networks (WANs) and etc.

Memory 320 and operating system 306 are in data communication with CPU 305 via bus 310. The memory components include both volatile and non-volatile memory and more than one of each type of memory, including random-access memory (RAM) 320, read-only memory (ROM) 325 and a mass storage device 345, the last comprising one or more solid-state drives (SSDs). Memory 320 also includes secure storage 346 for securely storing secret keys, or private keys. It should be noted that the contents within secure storage 346 are only accessible by a super-user or administrator of device 300 and may not be accessed by any user of device 300. One skilled in the art will recognize that the memory components described above comprise non-transitory computer-readable media and shall be taken to comprise all computer-readable media except for a transitory, propagating signal. Typically, the instructions are stored as program code in the memory components but can also be hardwired. Memory 320 may include a kernel and/or programming modules such as a software application that may be stored in either volatile or non-volatile memory.

Herein the term "CPU" is used to refer generically to any device or component that can process such instructions and may include a microprocessor, microcontroller, programmable logic device or other computational device. That is, CPU 305 may be provided by any suitable logic circuitry for receiving inputs, processing them in accordance with instructions stored in memory and generating outputs (for example to the memory components or on display 340). In this embodiment, CPU 305 may be a single core or multi-core processor with memory addressable space. In one example, CPU 305 may be multi-core, comprising—for example—an 8 core CPU.

In the subsequent sections, for brevity, reference is made only to the interactions between user device 210 and vehicle module 206. One skilled in the art will recognize that user device 210 may be replaced with device 220 or any other similar devices without departing from this disclosure.

In the subsequent sections, for brevity, reference is made only to the authenticating a BLUETOOTH connection between a user device and a vehicle using BLE technology. One skilled in the art will recognize that the BLUETOOTH connection may be replaced with WI-FI connection or any other wireless connection without departing from this disclosure. In other words, the following method for authenticating are involved can be used for authenticating wireless connection between a user device and a vehicle.

Figure 4:
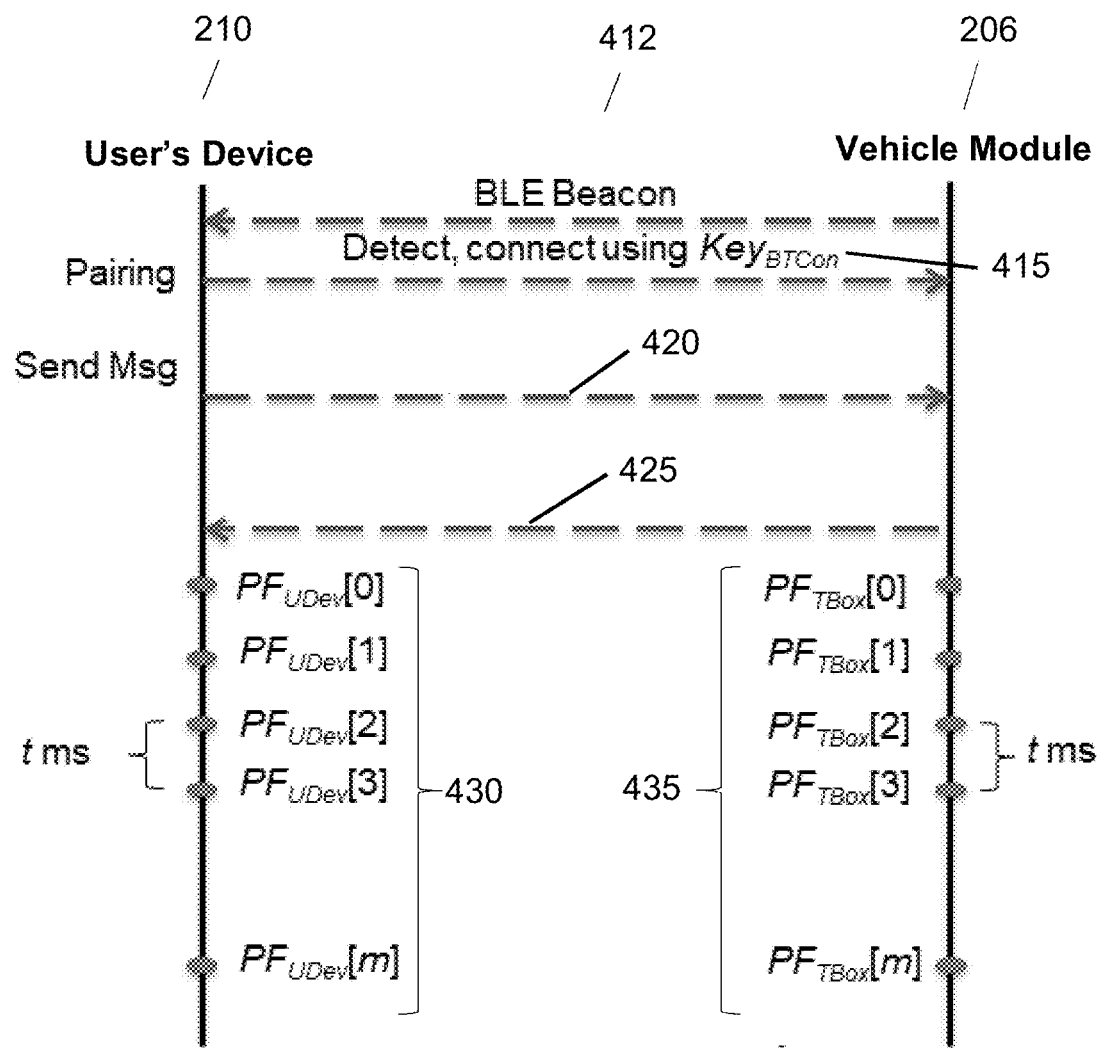
FIG. 4 illustrates a timing diagram for establishing a BLE connection between two devices and the recording of physical layer features of the BLE channel in accordance with embodiments of the disclosure.

As illustrated in FIG. 4, vehicle module 206 is configured to periodically transmit BLE beacons that contain the unique credentials/Identity of the vehicle 205. This is illustrated at step 412. When user 215 starts walking towards vehicle 205 and when user 215 is within communication range of the vehicle's BLE beacons, the user's personal device(s) 210 will detect and receive the BLE beacon transmitted from vehicle module 206. The vehicle's ID/credentials as contained in the BLE beacon is then used to identify that the vehicle 205 belongs to user 215. In accordance with embodiments of the disclosure, at step 415, when device 210 has determined that vehicle 205 belongs to user 215, device 210 will establish a BLUETOOTH pairing between device 210 and vehicle module 206 using the $Key_{BTCon}$, that was previously shared between device 210 and vehicle module 206 by a trusted entity.

The step 412 and step 415 are set up a BLUETOOTH pairing between the user device 210 and the vehicle module 206. The course of setting up a BLUETOOTH pairing is a process to be performed when the user device 210 and the vehicle module 206 first establish a BLUETOOTH connection.

After the BLUETOOTH pairing has been completed when the user device 210 closed to the vehicle module 206. The user device 210 can establish a BLUETOOTH connection directly with the vehicle module 206 and the user device 210 needn't re-entering the $Key_{BTCon}$. Once the BLUETOOTH pairing has been completed, device 210 will then generate an initiation instruction defined as ($ID_{UDev}$∥ CMD_START_AUTH, MAC ($Key_{BTUDev}$, $ID_{UDev}$∥ CMD_START_AUTH)) where initiation MAC $M_{Ini}$ is defined as MAC ($Key_{BTUDev}$, $ID_{UDev}$∥CMD_ START_AUTH), $ID_{UDev}$ is defined as the identity of the user's device 210 and CMD_START_AUTH is an initiation command identifier for instructing vehicle module 206 to initiate communications. The notation MAC (k, m) is a message authentication code using SHA-256 hash algorithm for a message m using a key k. At step 420, the initiation instruction is then communicated to vehicle module 206.

The user device 210 can based on the distance between the user device 210 and the vehicle module 206 generate the initiation instruction, for example when the user device 210 close to the vehicle module 206 the user device 210 generate the initiation instruction.

The user device 210 can based on the user's instruction generate the initiation instruction, for example when the user click the start button the user device 210 generate the initiation instruction.

Upon receiving the initiation instruction, vehicle module 206 will extract the identity $ID_{UDev}$ of user device 210 is from the initiation instruction. The extracted identity $ID_{UDev}$ is then used to retrieve a corresponding $Key_{BTUDev}$ from a database linked to vehicle module 206. The corresponding BUD Key, $Key_{BTUDev}$, is then used to validate the initiation instruction. Once validated, vehicle module 206 will then generate an acknowledgement instruction at step 425 whereby the acknowledgement instruction is defined as (E($Key_{BTUDev}$, n||r||CMD_ACK_AUTH), MAC($Key_{BTUDev}$, n||r||CMD_ACK_AUTH)), where acknowledgement MAC $MAC_{Ack}$ is defined as MAC($Key_{BTUDev}$, n||r||CMD_ACK_AUTH), the E(k, m) is an encryption function to encrypt message m with key k, CMD_ACK_AUTH is an acknowledgement command identifier for acknowledging a device, n is a nonce, and r is a random string. The acknowledgement instruction is then communicated to user device 210.

Upon receiving the initiation instruction, the vehicle module 206 will extract the identity $ID_{UDev}$ of user device 210 is from the initiation instruction. Once validated, the vehicle module 206 cannot execute the step 425.

In embodiments of the disclosure, vehicle module 206 is then configured to record physical layer features (PF) of the BLE channel established between the user device 210 and vehicle module 205. In embodiments of the disclosure, the physical features of the BLE channel may comprise RSS measures that were measured using a timer function with a t milliseconds (ms) timeout for a particular time period, e.g. a few seconds (4-5 seconds (s)) during which the user is walking towards his/her car.

Alternatively, the physical features of the BLE channel may comprise RSS measures that were measured in a time window, e.g. the time window set to 50 s and the vehicle module 206 measured the RSS ten timers in the time window.

Alternatively, a challenge response protocol can be employed for a synchronized PF reading between two parties with nonce n being applied to all communications. Here, the response must be sent within channel coherence time which typically comprises a few milliseconds. The recording of the physical layer features of the BLE channel $PF_{TBox}$ or $PF_{Veh}$ by vehicle module 206 is illustrated as step 435. One skilled in the art will recognize that step 435 may take place prior to the communication of the acknowledgement instruction or after the communication of the acknowledgement instruction without departing from the disclosure. Upon receiving the acknowledgement instruction, user device 210 will then validate the received acknowledgement instruction using the BUD Key, $Key_{BTUDev}$. Upon successfully validating the instruction, the acknowledgement message is then decrypted using the $Key_{BTUDev}$. The acknowledgement command is then retrieved from the decrypted message and the acknowledgement command causes the user device 210 to then record a set of physical layer features $PF_{UDev}$ of the BLE beacon's channel at step 430.

After step 430, both the user device 210 and vehicle module 206 will each have a set of physical layer features of the BLE beacon's channel recorded, i.e. $PF_{UDev}$ for user device 210, and $PF_{TBox}$ or $PF_{Veh}$ for vehicle module 206. The recorded set of physical layer features $PF_{UDev}$ and the set of physical layer features $PF_{TBox}$ or $PF_{Veh}$ are then mutually validated by a fuzzy extractor mechanism.

When the devices are connected over BLE, the wireless BLE channel exhibits reciprocity property, i.e. the wireless channels physical features e.g. signal strength, measured by both the legitimate devices in quick succession (within few a milliseconds) will be nearly the same. When two devices record these features over a short period of time, the overall variation observed by the two devices will be highly correlated. It should be noted that, the values may not be exactly similar, however, the overall trend or pattern of the two datasets will be nearly similar. Further, due to reciprocity property of the wireless channel, the recorded sets of $PF_{UDev}$ and $PF_{TBox}$ or $PF_{Veh}$ will both show high correlation in their variation trends even though the individually recorded values may not be exactly same because of in-channel noise, hardware factors, etc.

Figure 5:
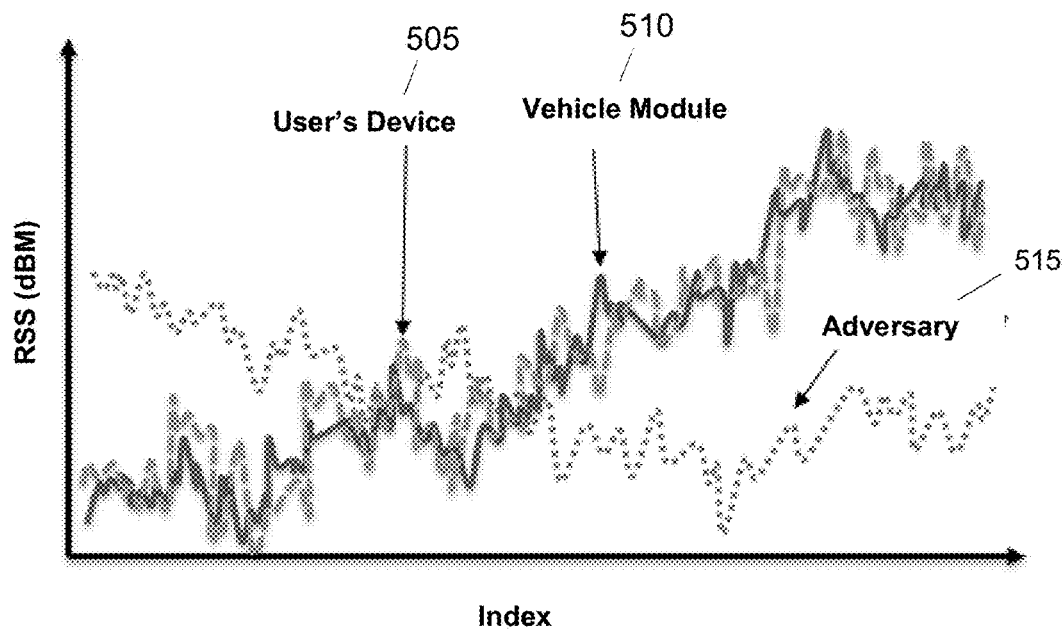
FIG. 5 illustrates a received signal strength variation as recorded by a user's device, a vehicle module and an adversary device.

At the same time, when an adversary or eavesdropper (third device/attacker) eavesdrops on the communication between the two legitimate devices (user's device and the vehicle module) and records the signal features, his/her channel features will be totally different compared to the recording done by legitimate devices. This is because, although the adversary is in the vicinity of the legitimate devices, the signal captured by him/her will be different due to the multi-path effects of the wireless channel, i.e., the signal takes different multiple paths to reach the adversary's device. Hence, the adversary cannot even guess the values obtained by car and user's device. Even if the adversary were to adopt the same scheme as the legitimate devices, he/she cannot be successful in authenticating the communications between the user device and the vehicle module. FIG. 5 illustrates the received signal strength variation as recorded by user device, vehicle module and adversary for the above scenario whereby plot 505 shows the recorded RSS for the user device, plot 510 shows the recorded RSS for the vehicle module and 515 shows the recorded RSS for the adversary.

Further, apply filtering to remove noise component in the recorded RSS on both the devices. A low pass filtering method is applied to original RSS (as shown in FIG. 5) to obtain filtered signals. the filtered receive signal strength variation as recorded by user device, vehicle module and adversary for the above scenario whereby plot 505 shows the filtered RSS for the user device, plot 510 shows the filtered RSS for the vehicle module and 515 shows the filtered RSS for the adversary.

And then, employ Binary quantization, i.e., m-ary quantization for processing the RSS samples (PF).

W—number of samples in window.

m—number of levels e.g., 2 or 4 or 8 etc.

A guard band (space) is inserted between two consecutive quantization levels. The samples in guard band are discarded.

Other samples are encoded as per their levels $Q_i$.

The ratio of guard band to data is denoted as $\alpha$.

The size of quantization interval and guard band are calculated as follows:

$$\int_{l_{i-1}}^{l_i - g_i} f\tilde{s}d\tilde{s} = \frac{1-\alpha}{m}, \int_{l_i - g_i}^{l_i} f\tilde{s}d\tilde{s} = \frac{\alpha}{m-1}.$$

Further, it should be noted that the disclosure allows both parties to detect active man-in-the-middle attacks as symmetric keys and signal variation patterns are employed to detect and authenticate the devices. Only the pair of connected wireless devices can have similar RSS values due to reciprocity property of wireless channel. This means that adversaries or other BLE devices in the vicinity of legitimate devices cannot predict the RSS values obtained by legitimate parties. The RSS trend can be used to confirm if the user is really approaching i.e., RSS value increases as the user approaches the vehicle. Hence, both the party's user's device and vehicle module can confirm this behavior. Therefore, the disclosure provides strong mutual authentication with the help of Physical layer features of wireless channel (BLE) that cannot be spoofed or guessed by an adversary/eavesdropper. The legitimate parties will get know by their physical layer features if there is any attack during authentication. Thus, relay and impersonation attacks are mitigated by the disclosure.

Figure 6A:
FIG. 6A and FIG. 6B illustrate block diagrams representative of cryptographically secure fuzzy extractor mechanism in accordance with embodiments of the disclosure.

In order to authenticate the physical layer features of the BLE beacon's channel as recorded by the user device 210 and the vehicle module 206, a cryptographically secure fuzzy extractor based mechanism is employed. A fuzzy extractor mechanism consists of a pair of functions gen 605 and rep 610 whereby the properties of these two functions 605, 610 are shown in FIG. 6A. The Gen function takes an input, a set of values w and produces a string s and set H. The rep function takes two inputs, a set w' which is nearly same as w, but has some errors with respect to w, and H produced by gen, to produce s which is exactly same as the s produced by gen. The exact workings of the fuzzy extractor mechanism are omitted for brevity.

Figure 6B:
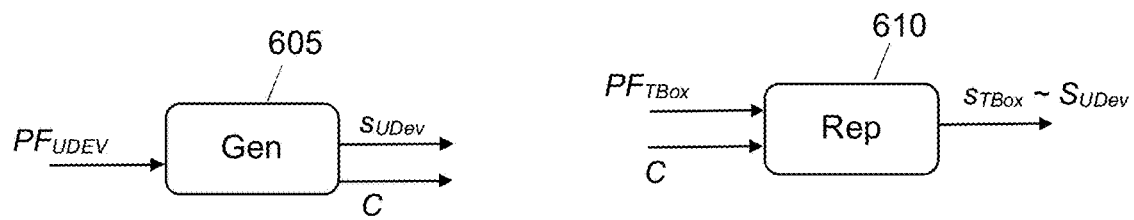

Hence, as illustrated in FIG. 6B, when the gen function 605 is used on the physical layer features of the BLE beacon's channel as recorded by the user device, the gen function takes in as its input the set of $PF_{UDev}$ and produces two outputs $s_{UDev}$ and C. As for the rep function 610, this function is applied by vehicle module 206 by taking as its input the physical layer features of the BLE beacon's channel as recorded by the vehicle module, $PF_{TBox}$ or $PF_{Veh}$ and C to produce seen that will be similar as that of $s_{UDev}$.

Figure 7:
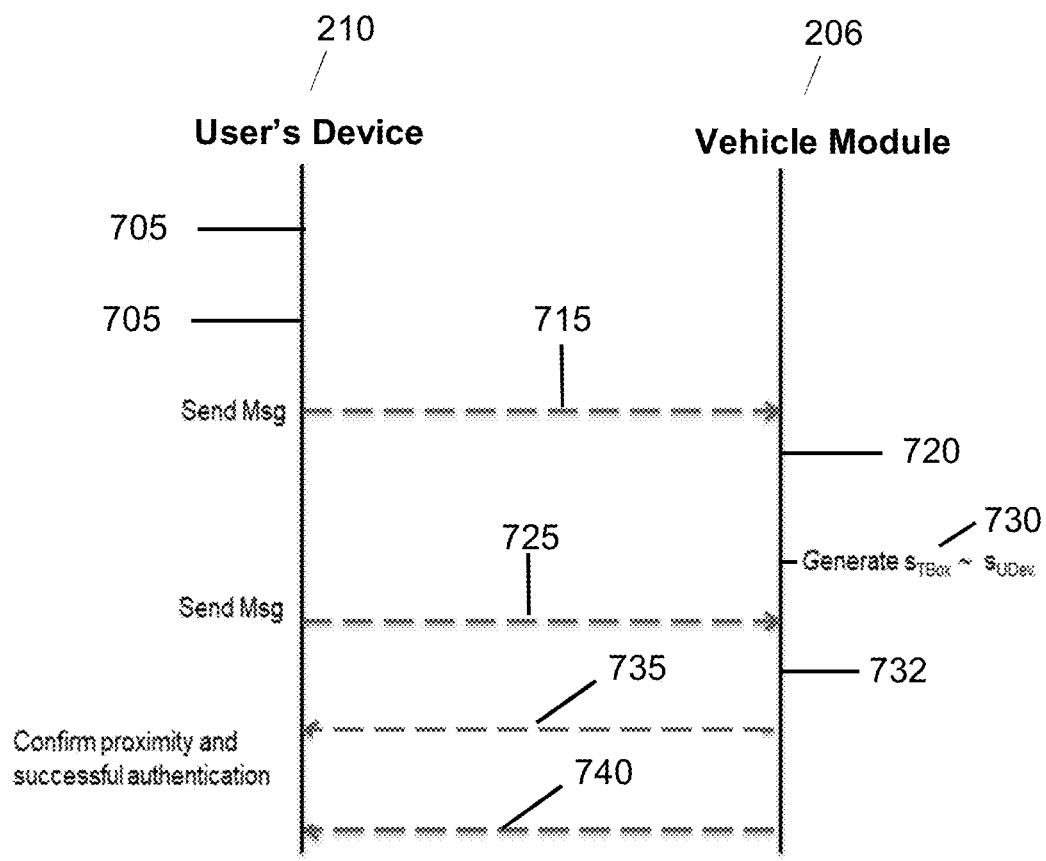
FIG. 7 illustrates a timing diagram for mutually authenticating the user device and the vehicle module based on the recorded physical layer features of the BLE channel in accordance with embodiments of the disclosure.

The mutual authentication of the physical layer features of the BLE beacon's channel as recorded by both the user device 210 and vehicle module 206 is illustrated in FIG. 7. At step 705, user device 210 first applies a low pass filter to $PF_{UDev}$ to remove any spikes that may occur due to noise in the channel. Subsequently at step 710, the Gen function is then applied to the set of recorded physical layer features of the BLE beacon's channel $PF_{UDev}$ to generate string $s_{UDev}$ and correction data C.

A verification instruction defined as $(E(Key_{BTUDev}, n\|C\|CMD\_HLP), MAC(Key_{BTUDev}, n\|C\|CMD\_HLP))$ is then generated at step 715, where verification MAC $M_{Ver}$ is defined as $MAC(Key_{BTUDev}, n\ H\ C\ CMD\_HLP)$, and CMD_HLP is a verification command identifier for instructing the vehicle module initiate mutual authentication steps.

At step 725, an authentication check instruction defined as $E(Key_{BTUDev}, n\|(r\ XOR\ s_{UDev})\|CMD\_AUTH\_CHK), MAC (Key_{BTUDev}, n\|(r\ XOR\ s_{UDev})\|CMD\_AUTH\_CHK))$ is then generated, where authentication check MAC $M_{Auth\_chk}$ is defined as $MAC(Key_{BTUDev}, n\|(r\ XOR\ s_{UDev})\| CMD\_AUTH\_CHK)$, and CMD_AUTH_CHK is an authentication check command identifier for instructing the vehicle module to compare the recorded physical layer features of the BLE beacon and XOR is a logic XOR operation.

Upon receiving the verification instruction and decrypting and validating the verification instruction, at step 720, C parameters are extracted from the verification instruction. Vehicle module 206 then applies filtering and at step 730, the Rep function is applied to the set of recorded physical layer features of the BLE beacon's channel $PF_{TBox}$ or $PF_{Veh}$ and C to produce $s_{Veh}$.

Upon receiving the authentication check instruction and decrypting and validating the authentication check instruction, vehicle module 206 verifies whether $((r\ XOR\ s_{UDev})$ as extracted from the authentication check message is same as $(r\ XOR\ s_{Veh})$ that was generated by vehicle module 206. This is done at step 732. If it is determined that both are the same, then the authentication is considered successful, and an approval instruction defined as $(E(Key_{BTUDev}, n\| CMD\_AUTH\_OK), MAC(Key_{BTUDev}, n\| CMD\_AUTH\_OK))$ is generated where approval MAC $M_{Apprv}$ is defined as $MAC(Key_{BTUDev}, n\| CMD\_AUTH\_OK)$, CMD_AUTH_OK is an approval command identifier and the approval instruction is sent to user device 210 at step 735.

Conversely, if the verification fails, an error instruction defined as $(E(Key_{BTUDev}, n\|CMD\_AUTH\_FAIL), MAC(Key_{BTUDev}, n\|CMD\_AUTH\_FAIL))$ is generated where error MAC $M_{Error}$ is defined as $MAC(Key_{BTUDev}, n\| CMD\_AUTH\_FAIL)$, CMD_AUTH_FAIL is an error command identifier and the error instruction is sent to user device 210 and the authentication is then rejected at step 740.

Upon receiving the instructions, the user device will validate either the received approval instruction or the error instruction using the $Key_{BTUDev}$. Once validated, the user device then proceeds to decrypt either the approval or error instruction.

In embodiments of the disclosure, if the BLUETOOTH on a user's device is not turned on while he/she is approaching the vehicle, automatic detection and authentication with the vehicle may not occur. Hence, in such a scenario, when the user notices the device's status indicates that the device is not connected to the vehicle, the user then turns on BLUETOOTH on his user device to enable the device to connect to the vehicle. Upon successfully pairing the device with the vehicle's module, the user device will detect that the user is already near the car using RSS information obtained during the pairing step. The user will then be notified via an application on their device to wave his/her device towards the vehicle, i.e. to move the device in random manner a few times. If the device is a smartphone, the user will just need to wave it towards the vehicle, and if the device is a smartwatch worn on wrist, the user just needs to wave the watch in the direction of the vehicle to authenticate as described above.

Second Embodiment: PKI Based Solution

In another embodiment of the disclosure, in addition to pre-sharing the $Key_{BTCon}$, the $Key_{BTUDev}$ between devices 210, 220 and vehicle module 206 by a trusted entity, public-private key pairs are also provided by the trusted entity to devices 210, 220 and vehicle module 206.

Figure 8:
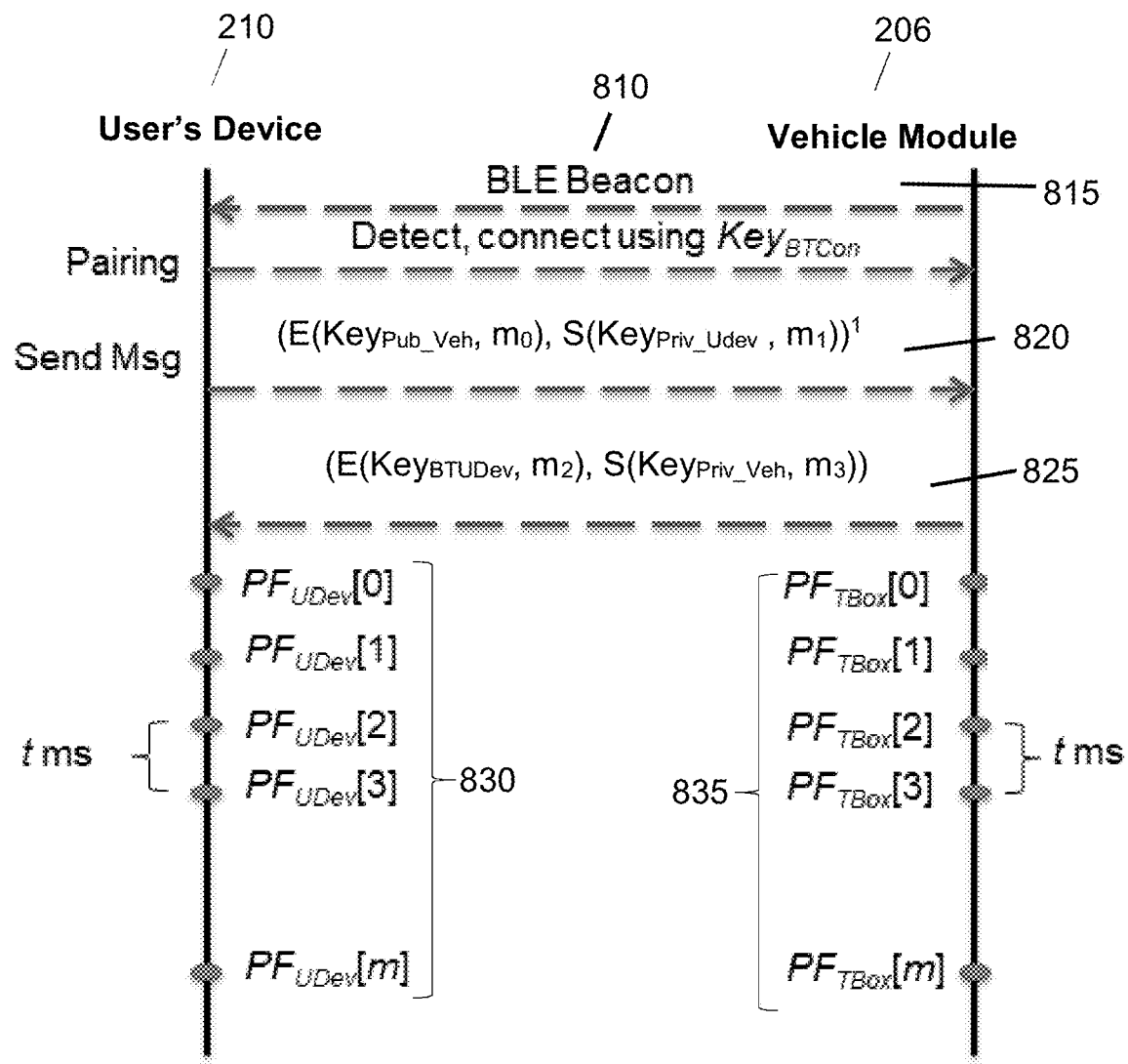
FIG. 8 illustrates a timing diagram for establishing a BLE connection between two devices and the recording of physical layer features of the BLE channel utilizing PKI in accordance with embodiments of the disclosure.

As illustrated in FIG. 8, vehicle module 206 is configured to periodically transmit BLE beacons that contain the unique credentials/Identity of the vehicle 205. This is illustrated as step 810. When user 215 is within communication range of the vehicle's BLE beacons, the user's personal device(s) 210 will detect and receive the BLE beacon transmitted from vehicle module 206. The vehicle's ID/credentials as contained in the BLE beacon is then used to identify that the vehicle 205 belongs to user 215.

In accordance with embodiments of the disclosure, at step 815, when device 210 has determined that vehicle 205 belongs to user 215, device 210 will establish a BLUETOOTH pairing between device 210 and vehicle module 206 using the $Key_{BTCon}$, that was previously shared between device 210 and vehicle module 206 by a trusted entity.

The step 810 and step 815 are set up a BLUETOOTH pairing between the user device 210 and the vehicle module 206. The course of setting up a BLUETOOTH pairing is a process to be performed when the user device 210 and the vehicle module 206 first establish a BLUETOOTH connection.

After the BLUETOOTH pairing has been completed when the user device 210 closed to the vehicle module 206. The user device 210 can establish a BLUETOOTH connection directly with the vehicle module 206 and the user device 210 needn't re-entering the $Key_{BTCon}$.

Once the BLUETOOTH pairing has been completed, device 210 will then generate an initiation instruction defined as $(E(Key_{Pub\_Veh}, m_0), S(Key_{Priv\_Udev}, m_1))$, where initiation message $m_0$ is defined as $(ID_{UDev}||CMD\_START\_AUTH)$, $ID_{UDev}$ is the identity of the user's device, and CMD_START_AUTH is the initiation command identifier for instructing vehicle module 206 to initiate communications. The encryption function $E(k, m)$ causes message m to be encrypted with key k, $m_1$ is defined as $H(Key_{BTUDev}, E(Key_{Pub\_Veh}, m_0))$, and the signing function $S(k, m)$ causes message m to be signed using key k. H comprises a hash function that performs the hash using SHA-256 hash algorithm. At step 820, the initiation instruction is then communicated to vehicle module 206. The user device 210 can based on the distance between the user device 210 and the vehicle module 206 generate the initiation instruction, for example when the user device 210 close to the vehicle module 206 the user device 210 generate the initiation instruction.

The user device 210 can based on the user's instruction generate the initiation instruction, for example when the user click the start button the user device 210 generate the initiation instruction.

Upon receiving the initiation instruction, the vehicle module 206 will verify the signed-hashed-encrypted initiation message in the initiation instruction using a $Key_{Pub\_UDev}$, and when it is verified, the vehicle module 206 then decrypts the encrypted initiation message using a $Key_{Priv\_Veh}$. Based on the decrypted initiation message, a corresponding $K_{BTUDev}$ for $ID_{UDev}$ is then retrieved from a database.

Vehicle module 206 will then generate an acknowledgement instruction at step 825 whereby the acknowledgement instruction is defined as $(E(Key_{BTUDev}, m_2), S(Key_{Priv\_Veh}, m_3))$, where, $m_2$ is defined as $(n||r||CMD\_ACK\_AUTH)$, where CMD_ACK_AUTH is an acknowledgement command identifier for acknowledging a device, n is a nonce, and r is a random string, and $m_3$ is defined as $H(Key_{BTUDev}, E(Key_{BTUDev}, m_2))$. The acknowledgement instruction is then communicated to user device 210. Upon receiving the initiation instruction, the vehicle module 206 will extract the identity $ID_{UDev}$ of user device 210 is from the initiation instruction. Once validated, the vehicle module 206 cannot execute the step 825.

In embodiments of the disclosure, vehicle module 206 is then configured to record physical layer features (PF) of the BLE channel established between the user device 210 and vehicle module 205. In embodiments of the disclosure, the physical features of the BLE channel may comprise RSS measures that were measured using a timer function with a t ms timeout for a particular time period, e.g. a few seconds (4-5 s) during which the user is walking towards his/her car.

Alternatively, the physical features of the BLE channel may comprise RSS measures that were measured in a time window, e.g. the time window set to 50 s and the vehicle module 206 measured the RSS ten timers in the time window.

Alternatively, a challenge response protocol can be employed for a synchronized PF reading between two parties with nonce n being applied to all communications. Here, the response must be sent within channel coherence time which typically comprises a few milliseconds. The recording of the physical layer features of the BLE channel $PF_{TBox}$ or $PF_{Veh}$ by vehicle module 206 is illustrated as step 835. One skilled in the art will recognize that step 835 may take place prior to the communication of the acknowledgement instruction or after the communication of the acknowledgement instruction without departing from the disclosure.

Upon receiving the acknowledgement instruction, user device 210 will then verify the signed-hashed-encrypted acknowledgement message in the acknowledgement instruction using a PKI-Public Key associated with the vehicle module, $Key_{Pub\_Veh}$. The encrypted acknowledgement message is then decrypted using the $K_{BTUDev}$ when the signed-hashed-encrypted acknowledgement message is verified. Once the message is decrypted, the user device 210 then proceeds to record a set of physical layer features $PF_{UDev}$ of the BLE beacon's channel at step 830.

After step 830, both the user device 210 and vehicle module 206 will each have a set of physical layer features of the BLE beacon's channel recorded, i.e. $PF_{UDev}$ for user device 210, and $PF_{TBox}$ or $PF_{Veh}$ for vehicle module 206. The recorded set of physical layer features $PF_{UDev}$ and the set of physical layer features $PF_{Veh}$ or $PF_{Veh}$ are then mutually validated by a fuzzy extractor mechanism which has been described in detail in the previous embodiment.

Figure 9:
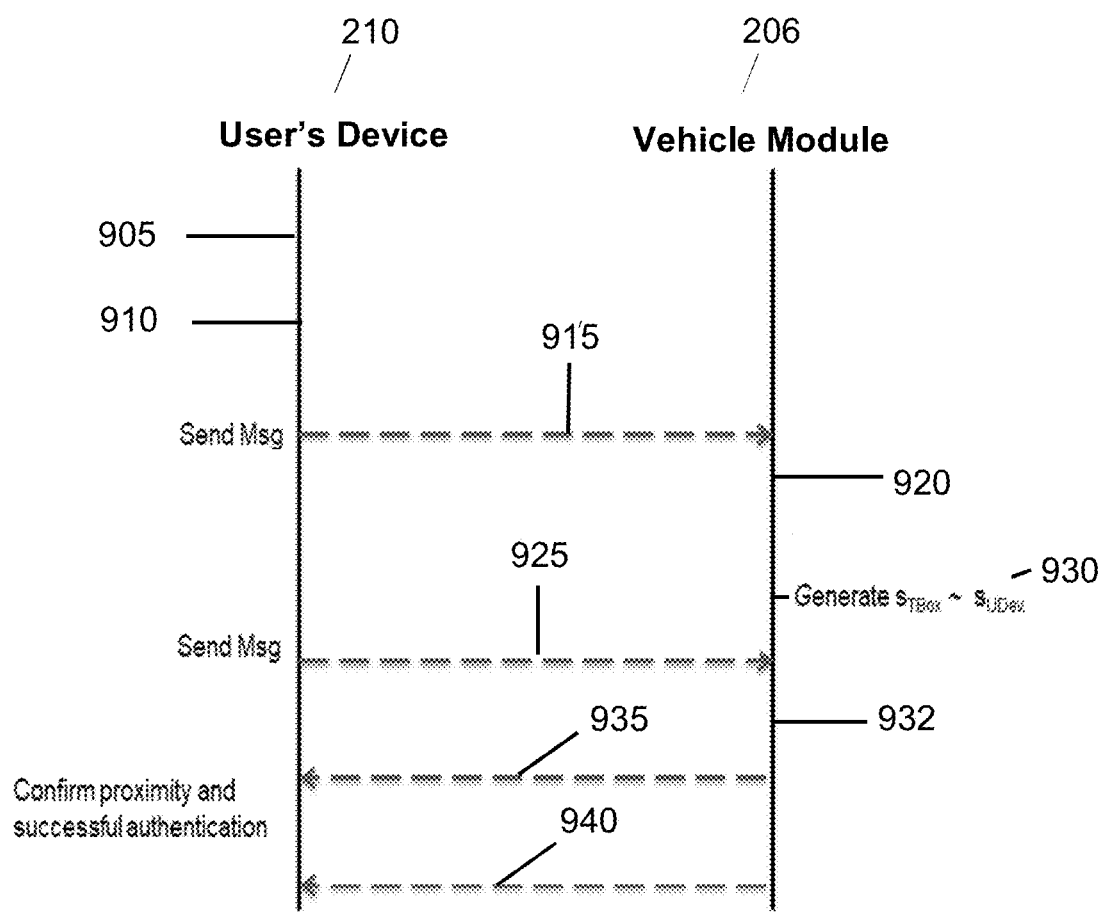
FIG. 9 illustrates a timing diagram for mutually authenticating the user device and the vehicle module based on the recorded physical layer features of the BLE channel using PKI in accordance with embodiments of the disclosure.

The mutual authentication of the physical layer features of the BLE beacon's channel as recorded by both the user device 210 and vehicle module 206 is illustrated in FIG. 9. At step 905, user device 210 first applies a low pass filter to $PF_{UDev}$ to remove any spikes that may occur due to noise in the channel. Subsequently at step 910, the Gen function is then applied to the set of recorded physical layer features of the BLE beacon's channel $PF_{UDev}$ to generate user string $s_{UDev}$ and correction data C.

A verification instruction defined as $(E(Key_{BTUDev}, S(Key_{Priv\_Udev}, m_5))$ is generated at step 915, where $m_4$ is defined as $(n||C||CMD\_HLP)$, where CMD_HLP is a verification command identifier for instructing the vehicle module initiate mutual authentication steps, $m_5$ is defined as $H(Key_{BTUDev}, E(Key_{BTUDev}, m_4))$.

At step 925, an authentication check instruction defined as $(E(Key_{BTUDev}, m_6), S((Key_{Priv\_Udev}, m_7))$ is then generated, where $m_6$ is defined as $(n||(r \text{ XOR } S_{UDev})||CMD\_AUTH\_CHK)$, where CMD_AUTH_CHK is an authentication check command identifier for instructing the vehicle module to compare the recorded physical layer features of the BLE beacon and XOR is a logic XOR operation and $m_7$ is defined as $H(Key_{BTUDev}, E(Key_{BTUDev}, m_6))$.

Upon receiving the verification instruction, the signed-hashed-encrypted verification message in the verification instruction is verified using a $Key_{Pub\_UDev}$. The encrypted verification message is then decrypted using the corresponding $K_{BTUDev}$, and the correction data C is extracted from the decrypted verification message. The vehicle module then filters the extracted correction data C and the set of physical layer features $PF_{Box}$ or $PF_{Veh}$ using a low pass filter when the verification instruction is validated at step 920. A vehicle string $S_{Veh}$ is then generated by providing the filtered set of physical layer features $PF_{Veh}$ and the filtered correction data C to a rep function of the fuzzy extractor mechanism at step 930.

Similarly, upon receiving the authentication check instruction, the signed-hashed-encrypted authentication check message in the authentication check instruction is verified using a $Key_{Pub\_UDev}$. The encrypted authentication check message is then decrypted using the corresponding $K_{BTUDev}$, when the signed-hashed-encrypted authentication check message is verified.

Upon decrypting and validating the authentication check instruction, vehicle module 206 verifies whether ((r XOR $s_{UDev}$) as extracted from the authentication check message is same as ($_r$ XOR $s_{Veh}$) that was generated by vehicle module 206. This is done at step 932. If it is determined that both are the same, then the authentication is considered successful, and an approval instruction defined as (E($Key_{BTUDev}$, $m_8$), S($Key_{Priv\_Veh}$, $m_9$)) is generated, where $m_8$=(n CMD_AUTH_OK), $m_9$=H($Key_{BTUDev}$, E($Key_{BTUDev}$, $m_8$)), and CMD_AUTH_OK is an approval command identifier to approve the mutual authentication. The approval instruction is then sent to user device 210 at step 935.

Conversely, if the verification fails, an error instruction defined as (E($Key_{BTUDev}$, $m_{10}$), S($Key_{Priv\_Veh}$, $m_{11}$)) is generated and mutual authentication is rejected, where $m_{10}$ is defined as (n||CMD_AUTH_FAIL), where mu is defined as H($Key_{BTUDev}$, E($Key_{BTUDev}$, $m_{10}$)), and CMD_AUTH_FAIL is the error command to reject the mutual authentication process. The error instruction is then sent to user device 210 at step 940.

Upon receiving the approval instructions, the user device will verify the signed-hashed-encrypted approval message in the approval instruction using a $Key_{Pub\_Veh}$. The encrypted approval message is then decrypted using the $K_{BTUDev}$, when the signed-hashed-encrypted approval message is verified. The authentication of the user device and the vehicle module is then completed based on the approval command in the decrypted approval message.

Conversely, upon receiving the error instructions, the user device will verify the signed-hashed-encrypted error message in the error instruction using a $Key_{Pub\_Veh}$. The encrypted error message is then decrypted using the $K_{BTUDev}$, when the signed-hashed-encrypted error message is verified. The authentication of the vehicle module and the user device is then rejected based on the error command in the decrypted approval message.

In accordance with another embodiment of the disclosure, with reference to FIG. 2 and FIG. 3, either one of user devices 210 or 220 may be used to authenticate BLUETOOTH or wireless communications with vehicle module 206. In particular, user device 210 has a processor 305 and a non-transitory media 320 readable by the processor 305 whereby the non-transitory media 320 is configured to store instructions. When these instructions are executed by the processor 305, the instructions cause processor 305 to generate an initiation instruction based on an identity of the user device $ID_{UDev}$, an initiation command, and an initiation MAC $M_{Ini}$, wherein the MAC $M_{Ini}$ is generated based on the identity of the user device $ID_{UDev}$, the initiation command and a $K_{BTUDev}$ that is shared between the user device 210 and the vehicle module 206, communicate the initiation instruction to the vehicle module 206 such that upon receiving the initiation instruction, the vehicle module 206 is configured to retrieve a corresponding $K_{BTUDev}$, from a database, based on the received initiation instruction and validate the initiation instruction using the retrieved corresponding $K_{BTUDev}$, generate an acknowledgement instruction based on an encrypted acknowledgement message and an acknowledgement MAC $M_{Ack}$, when the initiation instruction is validated, wherein the acknowledgement message comprises a nonce n, a random string r, and an acknowledgement command and the acknowledgement message is encrypted using the corresponding $K_{BTUDev}$, and the acknowledgement MAC $M_{Ack}$ is generated based on the acknowledgement message and the corresponding $K_{BTUDev}$, communicate the acknowledgement instruction to the user device 210, record a set of physical layer features $PF_{Veh}$ of the BLE beacon's channel, the user device 210 further comprising instructions for directing the processor to validate the acknowledgement instruction using the $K_{BTUDev}$, record a set of physical layer features $PF_{UDev}$ of the BLE beacon's channel when the acknowledgement instruction is validated, and authenticate the vehicle module 206 when the set of physical layer features $PF_{UDev}$ and the set of physical layer features $PF_{Veh}$ are validated by a fuzzy extractor mechanism.

In accordance with yet another embodiment of the disclosure, with reference to FIG. 2 and FIG. 3, either one of user devices 210 or 220 may be used to authenticate BLUETOOTH or wireless communications with vehicle module 206. In particular, user device 210 has a processor 305 and a non-transitory media 320 readable by the processor 305 whereby the non-transitory media 320 is configured to store instructions. When these instructions are executed by the processor 305, the instructions cause processor 305 to encrypt an initiation message, $m_o$, comprising an identity of the user device $ID_{UDev}$ and an initiation command, using a Public Key Infrastructure (PKI)-Public Key associated with a vehicle module, $Key_{Pub\_Veh}$, hash the encrypted initiation message using a $K_{BTUDev}$, and sign the hashed-encrypted initiation message using a $Key_{Priv\_UDev}$, generate an initiation instruction based on the encrypted initiation message and the signed-hashed-encrypted initiation message, communicate the initiation instruction to the vehicle module 206 such that upon receiving the initiation instruction, the vehicle module 206 is configured to verify the signed-hashed-encrypted initiation message in the initiation instruction using a $Key_{Pub\_UDev}$, decrypt the encrypted initiation message using a PKI-private key associated with the vehicle module 206, $Key_{Priv\_Veh}$ and retrieve a corresponding $K_{BTUDev}$, from a database, based on the decrypted initiation message when the signed-hashed-encrypted initiation message is verified, encrypt an acknowledgement message, $m_2$, comprising a nonce n, a random string r, and an acknowledgement command, using the corresponding $K_{BTUDev}$, hash the encrypted acknowledgement message using the corresponding $K_{BTUDev}$, and sign the hashed-encrypted acknowledgement message using the $Key_{Priv\_Veh}$, generate an acknowledgement instruction based on the encrypted acknowledgement message and the signed-hashed-encrypted acknowledgement message, communicate the acknowledgement instruction to the user device 210, record a set of physical layer features $PF_{Veh}$ of the BLE beacon's channel, the user device 210 further comprising instructions for directing the processor to verify the signed-hashed-encrypted acknowledgement message in the acknowledgement instruction using a $Key_{Pub\_Veh}$, decrypt the encrypted acknowledgement message using the $K_{BTUDev}$ when the signed-hashed-encrypted acknowledgement message is verified, record a set of physical layer features $PF_{UDev}$ of the BLE beacon's channel, and authenticate the vehicle module 206 when the set of physical layer features $PF_{UDev}$ and the set of physical layer features $PF_{Veh}$ are validated by a fuzzy extractor mechanism.

In accordance with yet another embodiment of the disclosure, with reference to FIG. 2 and FIG. 3, vehicle module 206 may be used to authenticate BLUETOOTH or wireless communications with either one of user devices 210 or 220. In particular, user device 210 has a processor 305 and a non-transitory media 320 readable by the processor 305 whereby the non-transitory media 320 is configured to store instructions. When these instructions are executed by the processor 305, the instructions cause processor 305 to receive an initiation instruction from the user device, wherein the initiation instruction is generated based on an identity of the user device $ID_{UDev}$, an initiation command, and an initiation MAC $M_{Ini}$, whereby the MAC $M_{Ini}$ is generated based on the identity of the user device $ID_{UDev}$, the initiation command and a $K_{BTUDev}$ that is shared between the user device 210 and the vehicle module 206, retrieve a corresponding $K_{BTUDev}$, from a database, based on the received initiation instruction and validate the initiation instruction using the retrieved corresponding $K_{BTUDev}$, generate an acknowledgement instruction based on an encrypted acknowledgement message and an acknowledgement MAC $M_{Ack}$, when the initiation instruction is validated, wherein the acknowledgement message comprises a nonce n, a random string r, and an acknowledgement command and the acknowledgement message is encrypted using the corresponding $K_{BTUDev}$, and the acknowledgement MAC $M_{Ack}$ is generated based on the acknowledgement message and the corresponding $K_{BTUDev}$, record a set of physical layer features $PF_{Veh}$ of the BLE beacon's channel, communicate the acknowledgement instruction to the user device 210 such that upon receiving the acknowledgement instruction, the user device 210 is configured to validate the acknowledgement instruction using the $K_{BTUDev}$, record a set of physical layer features $PF_{UDev}$ of the BLE beacon's channel when the acknowledgement instruction is validated, and authenticate the vehicle module when the set of physical layer features $PF_{UDev}$ and the set of physical layer features $PF_{Veh}$ are validated by a fuzzy extractor mechanism.

In accordance with yet another embodiment of the disclosure, with reference to FIG. 2 and FIG. 3, vehicle module 206 may be used to authenticate BLUETOOTH or wireless communications with either one of user devices 210 or 220. In particular, user device 210 has a processor 305 and a non-transitory media 320 readable by the processor 305 whereby the non-transitory media 320 is configured to store instructions. When these instructions are executed by the processor 305, the instructions cause processor 305 to receive an initiation instruction from the user device 210, wherein the initiation instruction is generated based on an encrypted initiation message and a signed-hashed-encrypted initiation message, the initiation message $m_o$ which comprises an identity of the user device $ID_{UDev}$ and an initiation command, is encrypted using a $Key_{Pub\_Veh}$, and the encrypted initiation message is hashed using a $K_{BTUDev}$, and signed using a $Key_{Priv\_UDev}$, verify the signed-hashed-encrypted initiation message in the initiation instruction using a $Key_{Pub\_UDev}$, decrypt the encrypted initiation message using a $Key_{Priv\_UDev}$ and retrieve a corresponding $K_{BTUDev}$, from a database, based on the decrypted initiation message when the signed-hashed-encrypted initiation message is verified, encrypt an acknowledgement message, $m_2$, comprising a nonce n, a random string r, and an acknowledgement command, using the corresponding $K_{BTUDev}$, hash the encrypted acknowledgement message using the corresponding $K_{BTUDev}$, and sign the hashed-encrypted acknowledgement message using the $Key_{Priv\_Veh}$, generate an acknowledgement instruction based on the encrypted acknowledgement message and the signed-hashed-encrypted acknowledgement message, record a set of physical layer features $PF_{Veh}$ of the BLE beacon's channel, communicate the acknowledgement instruction to the user device 210 such that upon receiving the acknowledgement instruction, the user device 210 is configured to verify the signed-hashed-encrypted acknowledgement message in the acknowledgement instruction using a $Key_{Pub\_Veh}$, decrypt the encrypted acknowledgement message using the $K_{BTUDev}$ when the signed-hashed-encrypted acknowledgement message is verified, record a set of physical layer features $PF_{UDev}$ of the BLE beacon's channel, and authenticate the vehicle module 206 when the set of physical layer features $PF_{UDev}$ and the set of physical layer features $PF_{Veh}$ are validated by a fuzzy extractor mechanism.

The above is a description of embodiments of a system and process in accordance with the present disclosure as set forth in the following claims. It is envisioned that others may and will design alternatives that fall within the scope of the following claims.

What is claimed is:

1. A vehicle comprising:
   a memory configured to store programming instructions; and
   a processor coupled to the memory, wherein the programming instructions cause the processor to be configured to:
   send, to a user device, a first wireless signal through a connection channel;
   receive, from the user device, a second wireless signal through the connection channel;
   acquire a second signal strength sequence from second N continuous signal strength characteristics of the second wireless signal;
   receive, from the user device in response to sending the first wireless signal, a first signal strength sequence from first N continuous signal strength characteristics of the first wireless signal; and
   authenticate a connection between the user device and the vehicle based on the first signal strength sequence and the second signal strength sequence.

2. The vehicle of claim 1, wherein the first signal strength sequence comprises the first N continuous signal strength characteristics.

3. The vehicle of claim 2, wherein the first signal strength sequence further comprises a user string and a correction data, and wherein the user string and the correction data are based on a filtered first N continuous signal strength characteristics.

4. The vehicle of claim 3, wherein the programming instructions further cause the processor to be configured to:
   extract the correction data from the first signal strength sequence;
   filter the correction data using a low pass filter to obtain a filtered correction data;
   filter the second N continuous signal strength characteristics using the low pass filter to obtain a filtered second N continuous signal strength characteristics;
   generate a vehicle string by inputting the filtered second N continuous signal strength characteristics and the filtered correction data to a reproduce (rep) function of a fuzzy extractor mechanism; and
   authenticate, based on the user string and the vehicle string, the connection.

5. The vehicle of claim 4, wherein the programming instructions further cause the processor to be configured to identify that the connection is valid based on characters at M corresponding positions in the user string and the vehicle string being the same, and wherein the M is a positive integer greater than or equal to a preset threshold.

6. The vehicle of claim 1, wherein before acquiring the second signal strength sequence, the programming instructions further cause the processor to be configured to:
   receive an initiation instruction from the user device; and
   authenticate the user device based on the initiation instruction.

7. The vehicle of claim 6, wherein the initiation instruction comprises:
   an initiation message authentication code (MAC) ($M_{Ini}$) indicating an instruction for the vehicle to authenticate the initiation instruction based on a BLUETOOTH user device (BUD) key ($K_{BTUDev}$) that is shared between the user device and the vehicle; or
   a sign (S) indicating an instruction for the vehicle to authenticate the initiation instruction based on a public-key infrastructure (PKI)-private key associated with the user device ($Key_{Priv\_UDeva}$) and the $K_{BTUDev}$ and a PKI-public key associated with the vehicle ($Key_{Pub\_Veh}$),
   wherein the $Key_{Priv\_UDev}$ and the $Key_{Pub\_Veh}$ are shared between the user device and the vehicle.

8. The vehicle of claim 1, wherein before receiving the second wireless signal, the programming instructions cause the processor to be configured to:
   emit a BLUETOOTH Low Energy (BLE) beacon; and
   establish a BLUETOOTH pairing between the user device and the vehicle using a BLUETOOTH connection key ($Key_{BTCon}$) based on whether the BLE beacon is detected, wherein the $Key_{BTCon}$ is shared between the user device and the vehicle.

9. A system comprising:
   a vehicle configured to send a first wireless signal through a connection channel; and
   a user device coupled to the vehicle and configured to:
      receive, from the vehicle, the first wireless signal through the connection channel;
      send, to the vehicle, a second wireless signal through the connection channel;
      acquire a first signal strength sequence from first N continuous signal strength characteristics of the first wireless signal; and
      communicate the first signal strength sequence to the vehicle, wherein the vehicle is further configured to:
      receive, from the user device, the second wireless signal through the connection channel;
      acquire a second signal strength sequence from second N continuous signal strength characteristics of the second wireless signal; and
      receive, from the user device, the first signal strength sequence,
   wherein the first signal strength sequence and the second signal strength sequence are for authenticating a connection between the user device and the vehicle.

10. The system of claim 9, wherein the first signal strength sequence comprises the first N continuous signal strength characteristics.

11. The system of claim 10, wherein the first signal strength sequence further comprises a user string and a correction data.

12. The system of claim 11, wherein the user device is further configured to:
   filter the first N continuous signal strength characteristics by a low pass filter to obtain a filtered first N continuous signal strength characteristics; and
   generate the user string and the correction data by inputting the filtered first N continuous signal strength characteristics to a generate (gen) function of a fuzzy extractor mechanism.

13. The system of claim 9, wherein before acquiring the first signal strength sequence, the user device is further configured to communicate, to the vehicle, an initiation instruction instructing to authenticate the user device.

14. The system of claim 13, wherein the initiation instruction comprises:
   an initiation message authentication code (MAC) ($M_{Ini}$) instructing the vehicle to authenticate the initiation instruction based on a BLUETOOTH user device (BUD) key ($K_{BTUDev}$) that is shared between the user device and the vehicle; or
   a sign (S) instructing the vehicle to authenticate the initiation instruction based on a public-key infrastructure (PKI)-private key associated with the user device ($Key_{Priv\_UDev}$) that is shared between the user device and the vehicle.

15. The system of claim 13, wherein the vehicle is further configured to:
   identify that the initiation instruction is valid; and
   communicate, in response to the identifying, an acknowledgement instruction to the user device, wherein the acknowledgement instruction is based on an encrypted acknowledgement message and an acknowledgement MAC ($M_{Ack}$), wherein the encrypted acknowledgement message comprises a nonce n, a random string r, and an acknowledgement command, wherein the encrypted acknowledgement message is encrypted using a corresponding BLUETOOTH user device (BUD) key ($K_{BTUDev}$), and wherein the $M_{Ack}$ is based on the encrypted acknowledgement message and the $K_{BTUDev}$, and
   wherein the user device is further configured to validate the acknowledgement instruction using the $K_{BTUDev}$.

16. The system of claim 13, wherein the vehicle is further configured to emit a BLUETOOTH Low Energy (BLE) beacon, and wherein the user device is further configured to:
   detect the BLE beacon; and
   establish, in response to the detecting, a BLUETOOTH pairing between the user device and the vehicle using a BLUETOOTH connection key ($Key_{BTCon}$), wherein the $Key_{BTCon}$ is shared between the user device and the vehicle.

17. An authentication method, comprising:
   sending, by a vehicle and to a user device, a first wireless signal through a connection channel;
   receiving, by the vehicle and from the user device, a second wireless signal through the connection channel;
   acquiring, by the vehicle, a second signal strength sequence from second N continuous signal strength characteristics of the second wireless signal;
   receiving, by the vehicle and from the user device in response to sending the first wireless signal, a first signal strength sequence from first N continuous signal strength characteristics of the first wireless signal; and
   authenticating, by the vehicle, a connection between the user device and the vehicle based on the first signal strength sequence and the second signal strength sequence.

18. The authentication method of claim 17, wherein the first signal strength sequence comprises the first N continuous signal strength characteristics.

19. The authentication method of claim 18, wherein the first signal strength sequence further comprises a user string and a correction data, and wherein the user string and the correction data are based on a filtered first N continuous signal strength characteristics.

20. The authentication method of claim 19, further comprising:
extracting, by the vehicle, the correction data from the first signal strength sequence;
filtering, by the vehicle, the correction data using a low pass filter to obtain a filtered correction data;
filtering, by the vehicle, the second N continuous signal strength characteristics using the low pass filter to obtain a filtered second N continuous signal strength characteristics;
generating, by the vehicle, a vehicle string by inputting the filtered second N continuous signal strength characteristics and the filtered correction data to a reproduce (rep) function of a fuzzy extractor mechanism; and
authenticating, by the vehicle, based on the user string and the vehicle string, the connection.

21. The authentication method of claim 20, further comprising identifying, by the vehicle, that the connection is valid based on characters at M corresponding positions in the user string and the vehicle string being the same, wherein the M is a positive integer greater than or equal to a preset threshold.

22. The authentication method of claim 17, wherein before acquiring the second signal strength sequence, the authentication method further comprises:
receiving, by the vehicle, an initiation instruction from the user device; and
authenticating, by the vehicle, the user device based on the initiation instruction.

23. The authentication method of claim 22, wherein the initiation instruction comprises:
an initiation message authentication code (MAC) ($M_{Ini}$) indicating an instruction for the vehicle to authenticate the initiation instruction based on a BLUETOOTH user device (BUD) key ($K_{BTUDev}$) that is shared between the user device and the vehicle; or
a sign (S) indicating an instruction for the vehicle to authenticate the initiation instruction based on a public-key infrastructure (PKI)-private key associated with the user device ($Key_{Priv\_UDeva}$) and the $K_{BTUDev}$ and a PKI-public key associated with the vehicle ($Key_{Pub\_Veh}$),
wherein the $Key_{Priv\_UDev}$ and the $Key_{Pub\_Veh}$ are shared between the user device and the vehicle.

24. The authentication method of claim 17, wherein before receiving the second wireless signal, the authentication method further comprises:
emitting, by the vehicle, a BLUETOOTH Low Energy (BLE) beacon; and
establishing, by the vehicle, a BLUETOOTH pairing between the user device and the vehicle using a BLUETOOTH connection key ($Key_{BTCon}$) based on whether the BLE beacon is detected, wherein the $Key_{BTCon}$ is shared between the user device and the vehicle.

* * * * *

UNITED STATES PATENT AND TRADEMARK OFFICE
CERTIFICATE OF CORRECTION

PATENT NO. : 11,381,970 B2
APPLICATION NO. : 17/346823
DATED : July 5, 2022
INVENTOR(S) : Revadigar et al.

It is certified that error appears in the above-identified patent and that said Letters Patent is hereby corrected as shown below:

On the Title Page

Item (30) Foreign Application Priority Data: "April 16, 2019 (WO) PCT/CN2019/082911" needs to be added Signed and Sealed this
Thirtieth Day of August, 2022

Katherine Kelly Vidal
*Director of the United States Patent and Trademark Office*